United States Patent [19]

Ayerst et al.

[11] Patent Number: 5,761,196
[45] Date of Patent: Jun. 2, 1998

[54] CODE DIVISION MULTIPLE ACCESS (CDMA) INBOUND MESSAGING SYSTEM UTILIZING RE-USE OF SEQUENCES

[76] Inventors: Douglas I. Ayerst, 111 NW. 11th St., Delray Beach, Fla. 33444; Stephen R. Carsello, 3550 NE. 4th Ave., Boca Raton, Fla. 33431; Warren P. Glotzbach, 12246 Sannenwood La., West Palm Beach, Fla. 33414

[21] Appl. No.: 339,443

[22] Filed: Nov. 14, 1994

Related U.S. Application Data

[63] Continuation of Ser. No. 4,159, Jan. 13, 1993, abandoned.

[51] Int. Cl.$^6$ .............................. H04J 13/02; H04L 27/30
[52] U.S. Cl. .................... 370/335; 370/342; 375/200; 375/208
[58] Field of Search .............................. 375/200, 206, 375/208; 340/825.44; 455/33.1, 49.1, 51.1, 53.2, 54.2, 56.1, 422, 465, 500, 502, 507, 525; 370/320, 329, 335, 342

[56] References Cited

U.S. PATENT DOCUMENTS

| | | | |
|---|---|---|---|
| 4,882,579 | 11/1989 | Siwiak | 340/825.44 |
| 4,891,637 | 1/1990 | Siwiak et al. | 340/825.44 |
| 4,918,437 | 4/1990 | Jasinski et al. | 340/825.44 |
| 4,968,966 | 11/1990 | Jasinski et al. | 340/825.44 |
| 5,005,014 | 4/1991 | Jasinski | 340/825.44 |
| 5,056,109 | 10/1991 | Gilhousen et al. | 375/1 |
| 5,103,459 | 4/1992 | Gilhousen et al. | 375/1 |
| 5,105,435 | 4/1992 | Stilwell | 375/1 |
| 5,109,390 | 4/1992 | Gilhousen et al. | 375/1 |
| 5,212,808 | 5/1993 | Su et al. | 455/51.1 |
| 5,247,702 | 9/1993 | Su et al. | 455/34.1 |
| 5,258,995 | 11/1993 | Su et al. | 375/1 |
| 5,267,244 | 11/1993 | Messerschmitt et al. | 370/18 X |

OTHER PUBLICATIONS

"Near–Far Resistance of Multiuser Detectors in Asynchronous Channels", by Lupas et al., published Apr., 1990, by IEEE Transactions on Communications, vol. 38, No. 4, pp. 496–508.

"Optimally Near–Far Resistant Multiuser Detection in Differentially Coherent Synchronous Channels", by Varanasi et al., published by IEEE Transactions on Information Theory, vol. 37, No. 4, pp. 1006–1018, Jul. 1991.

*Primary Examiner*—Young T. Tse
*Attorney, Agent, or Firm*—Philip P. Macnak

[57] ABSTRACT

A central controller (10) controls the operation of a code division multiple access (CDMA), spread spectrum communication system, which includes base stations (15) and portable transceivers (20) for communicating with the base stations (15). The central controller (10) stores a plurality of seeds, which are used by the portable transceivers (20) in generating pseudo-noise (PN) sequences, and, in response to requests from base stations (15), the central controller (10) distributes at least a portion of the assignable seeds to each of the requesting base stations (15). The base stations (15) that have received seeds from the central controller (10) subsequently transmit the seeds over the air to the portable transceivers (20) within their respective coverage areas. The portable transceivers (20) then utilize the seeds to generate spread spectrum signals for reception by a closest base station (15) having a coverage area in which they are located.

13 Claims, 15 Drawing Sheets

CODE DIVISION MULTIPLE ACCESS (CDMA) INBOUND MESSAGING SYSTEM UTILIZING RE-USE OF SEQUENCES

RELATED APPLICATIONS

This is a continuation of application Ser. No. 08/004,159, filed Jan. 13, 1993, now abandoned.

FIELD OF THE INVENTION

This invention relates in general to code division multiple access (CDMA) messaging systems, and more specifically to a CDMA inbound messaging system in which fixed base stations are grouped into re-use groups.

BACKGROUND OF THE INVENTION

Many conventional messaging systems include portable radio communication devices carried by subscribers and at least one fixed base station for transmitting messages to the radio communication devices for subsequent presentation to the subscribers. In some of these systems, one or more of the radio communication devices may be transceivers capable of transmitting signals as well as receiving messages from the base station. These systems are described as two-way messaging systems.

In two-way messaging systems, a portable transceiver can signal a base station for a number of reasons. By way of example, the portable transceiver could transmit a signal to the base station to deliver a message, to acknowledge reception of a message, or to indicate to the base station that the portable transceiver is located within the coverage area of the base station.

Currently, one-way messaging systems, e.g., paging systems, are typically allocated a frequency channel, for example, 25 kHz. To add two-way messaging capability to such a system, portable transceivers require limited throughput to the base station, e.g., 100 bits/sec. Additionally, to maximize battery life, it is desirable for the portable transceivers to use low power levels when transmitting. However, it is then necessary to transmit at a very low rate in order to balance the range between the low power inbound channel and the high-rate, high-power outbound channel. If the low-rate inbound signals are multiplexed into the channel, a plurality of the portable transceivers could share a single channel.

One possible method for multiplexing a set of narrowband inbound signals is frequency division multiple access (FDMA). However narrowband FDMA has the undesirable property that a great deal of frequency accuracy is required in the local oscillators of the portable transceivers in order to contain each signal within its allotted spectrum. In order to fully utilize the spectrum allocated for FDMA, it would be necessary to have nearly perfect frequency generation in the portable transceivers, which is expensive to implement. To allow for error in the transmitter local oscillators, it is therefore necessary to provide sufficient guardbands between inbound subchannels. However, this results in a waste of spectrum.

Another method for multiplexing a set of narrowband inbound signals is the use of code division multiple access (CDMA). CDMA portable transceivers are simple to implement in comparison to those used in narrowband FDMA systems because multiplexing occurs in the code domain where frequency accuracy is not as critical. In addition, guardbands between subchannels are not required because all subchannels occupy the same spectrum. However, it is well known that CDMA systems are interference limited, i.e., the number of simultaneously transmitting portable transceivers is limited. Furthermore, existing CDMA systems often suffer from the near-far problem. This problem occurs when a fixed base station is unable to detect an inbound spread spectrum signal that is significantly lower in power than other simultaneously received inbound spread spectrum signals. In order to make a CDMA system perform properly, therefore, it is necessary to control the amount of interference, which depends upon the amount of traffic, on the inbound channel. Additionally, it is typically necessary to include complex power control circuitry, which is often expensive and bulky, in the portable transceivers to ensure that all of the transmitted spread spectrum signals are detectable by the base station.

Thus, what is needed is a CDMA system that alleviates the near-far problem while allowing flexibility in the number of simultaneously transmitting portable transceivers. Furthermore, the portable transceivers for use in the CDMA system should not require the addition of complex power or frequency control circuitry.

SUMMARY OF THE INVENTION

According to a first aspect of this invention, in a communication system comprising base stations for communicating with portable transceivers and a central controller for controlling the operation of the base stations and for assigning seeds, a method comprises the steps of the central controller determining which of the seeds are available seeds and assigning a subset of the available seeds to a first one of the base stations.

According to a second aspect of this invention, a communication system for providing two-way communication comprises base stations for transmitting and receiving information and a central controller coupled to and controlling the base stations. The central controller selectively assigns seeds to each of the base stations in accordance with the information transmitted and received by the base stations.

DESCRIPTION OF A PREFERRED EMBODIMENT

System Description

Figure 1:
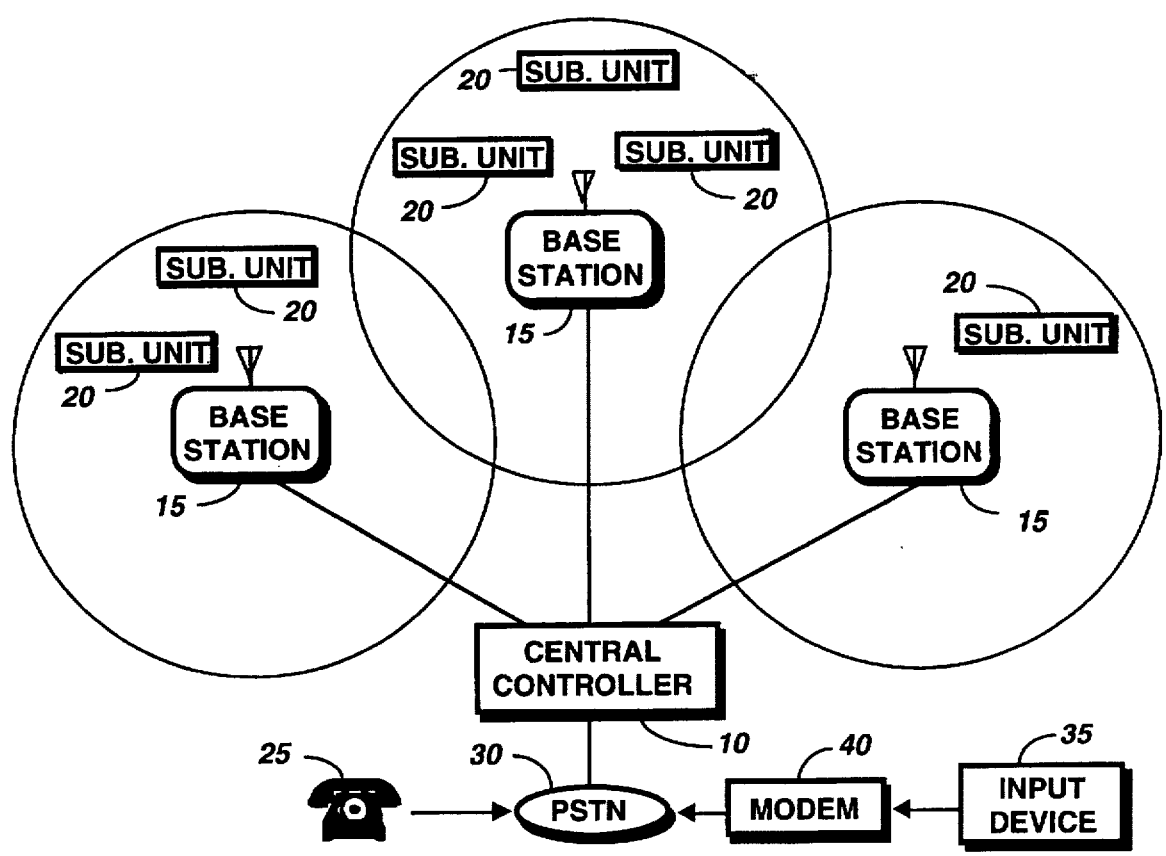
FIG. 1 is an illustration of a messaging system in accordance with a preferred embodiment of the present invention.

Referring to FIG. 1, a code division multiple access (CDMA) messaging system in accordance with a preferred embodiment of the present invention comprises a central controller 10 for controlling a plurality of base stations 15, each of which has a coverage area within which it transmits a radio frequency (RF) signal. The central controller 10 is preferably coupled to each of the base stations 15 by dedicated wireline, although, alternatively, the central controller 10 may be coupled to the base stations 15 via a telephone network or a radio frequency channel. The messaging system further comprises a plurality of subscriber units 20, i.e., portable transceivers, which receive information, including selective call messages, from the base stations 15. According to the present invention, the subscriber units 20 are able to transmit information, such as "acknowledge" signals, inbound messages, etc., to the base stations 15 as well. The subscriber units 20 preferably transmit the information to the base stations 15 through use of a spread spectrum communication technique in which pseudo-noise (PN) sequences, or codes, are used to spread a signal over a given bandwidth. PN sequences are generated by the subscriber units 20 and are dependent upon information transmitted to the subscriber units 20 by the base stations 15. This information generally includes tap information, specifying feedback tap placement, and the initial state of shift registers that may be used to generate the PN sequences. The initial states of the shift registers will hereafter be referred to as "seeds". The information further includes register order information, which conveys the length of the seeds.

Messages may be provided to the central controller 10 by a telephone 25 through a telephone network, such as the public switched telephone network (PSTN) 30 or a private branch exchange. Additionally, messages may be received by the central controller 10 via the PSTN 30 from another input device 35, e.g., a personal computer, utilizing a modem 40. Preferably, identification information corresponding to each message is provided to the central controller 10 at the time when the message is provided. For each message, the central controller 10 compares the accompanying identification information with subscriber unit addresses stored in memory. Thereafter, the central controller 10 retrieves the address associated with the subscriber unit 20 to which the message is directed and provides the address and message to a base station 15 having a coverage area in which the targeted subscriber unit 20 is possibly located. The base station 15 then encodes the address and the message into a selective call signal for transmission to the subscriber unit 20.

Figure 2:
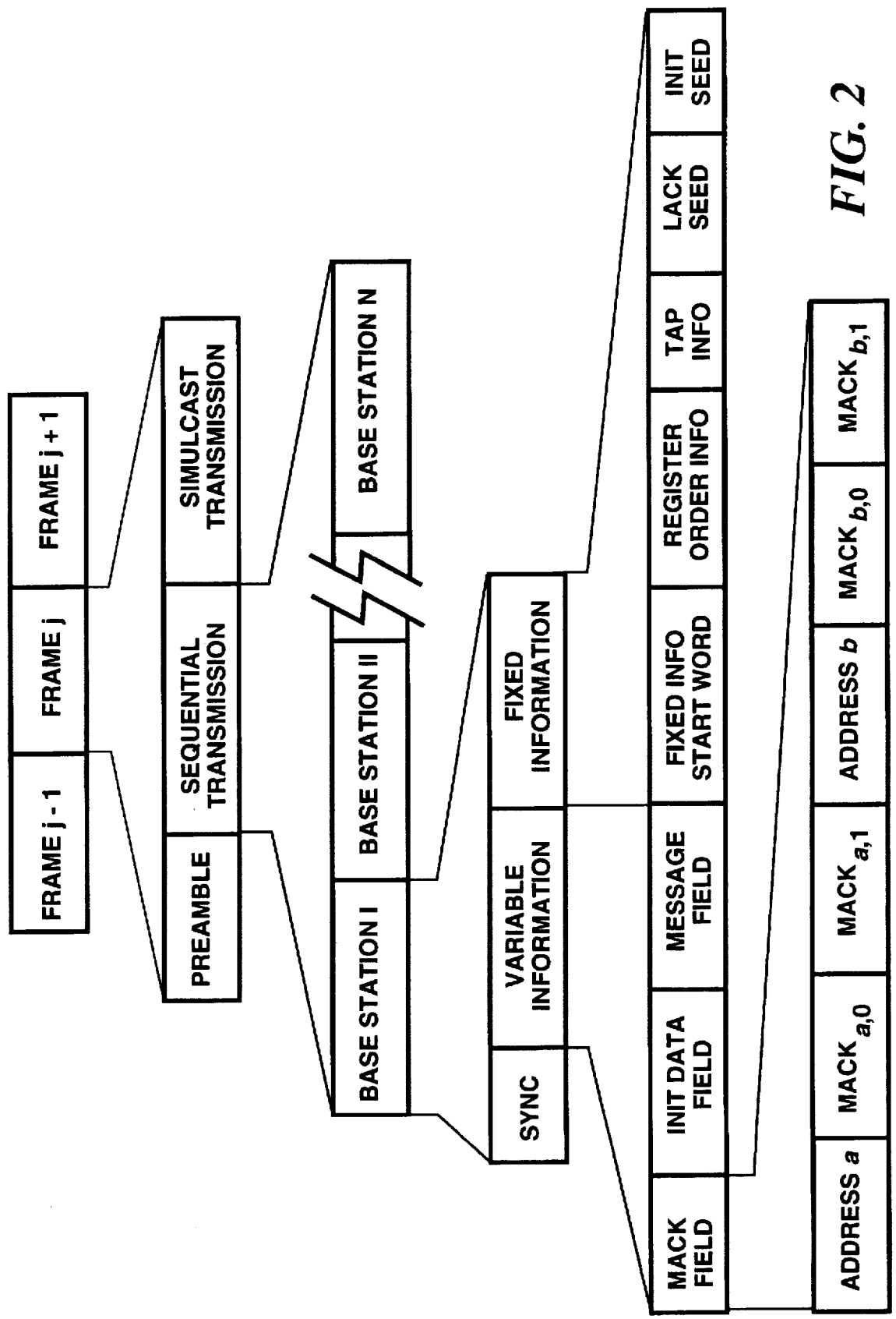
FIGS. 2–9 are timing diagrams depicting the signal protocol of the messaging system of FIG. 1 in accordance with the preferred embodiment of the present invention.

FIGS. 2–9 are timing diagrams illustrating the transmission format of the signaling protocol utilized in accordance with the preferred embodiment of the present invention. As shown in FIG. 2, the signaling protocol comprises a plurality of frames, each of which includes a preamble, a sequential transmission, and a simulcast transmission, during which all of the base stations 15 included within the messaging system transmit simultaneously. Preferably, the sequential transmission is implemented at a high data rate compared to the simulcast transmission. For example, data transmitted during the sequential transmission may be transmitted at 12 kilobits per second (kbps), while data transmitted during the simulcast transmission may be transmitted at 1200 bps. According to the present invention, during the sequential transmission, the base stations 15 transmit one at a time, at the direction of the central controller 10, to allow each subscriber unit 20 to determine which of the base stations 15 is providing the strongest signal. Preferably, the sequential transmission for each base station 15 comprises a synchronization (sync) word, variable information, and fixed information, which usually remains unchanged throughout transmission of the different frames.

At the beginning of the sequential transmission, the central controller 10 directs a first base station, base station I, to begin transmitting. As shown in FIG. 2, base station I transmits a sync word during which subscriber units 20 located within the coverage area of base station I obtain synchronization with the transmission. Thereafter, base station I transmits the variable information comprising a message field and seed fields, which each contain one or more seeds for use by subscriber units 20.

The variable information is preferably followed by the transmission of the fixed information, which is provided by the central controller 10 for transmission to the subscriber units 20 located within the coverage area of base station I. In accordance with the preferred embodiment of the present invention, the fixed information comprises a fixed information "start word", register order information, which specifies a seed length n, and tap information, each of which is stored by the subscriber units 20 for subsequent initialization of a sequence generator located within each subscriber unit 20, as will be described in greater detail below. Alternatively, the register order information and the tap information could be programmed into the subscriber units 20 at the time of manufacturing the subscriber units 20. However, the over-the-air programming allows the register order information and the tap information to be changed by the central controller 10, if necessary. For example, the tap information and register order information may be changed, through over-the-air programming, to allow "roaming" of subscriber units 20 between different CDMA messaging systems. According to the present invention, the same register order information and tap information is transmitted by each of the base stations 15 included within the messaging system.

The fixed information further comprises unique seeds, which are different for each of the base stations 15 within the messaging system, unlike the register order information and the taps. The seeds are binary numbers having n bits, where n is the length specified in the register order information. The seeds transmitted by each of the base stations 15, including base station I, during transmission of the fixed information include a location acknowledgment (LACK) seed and an initialization (INIT) seed, each of which are utilized by the subscriber units 20 in a manner to be described below. The LACK and INIT seeds are preferably unique to each base station 15.

Upon entry into the messaging system, such as when a subscriber unit 20 is turned on, each entering subscriber unit 20 waits to receive the preamble announcing the beginning of a frame of transmitted data. Thereafter, the subscriber unit 20 ignores the variable information transmitted by each of the base stations 15 during the sequential transmission and receives the fixed transmissions from all of the base stations 15 having a coverage area in which the subscriber unit 20 is located. The subscriber unit 20 determines which of the transmitting base stations 15 has the strongest signal and stores the fixed information, i.e., the register order information, taps, and seeds, provided by that base station 15 for subsequent utilization, as will be described below.

Figure 3:
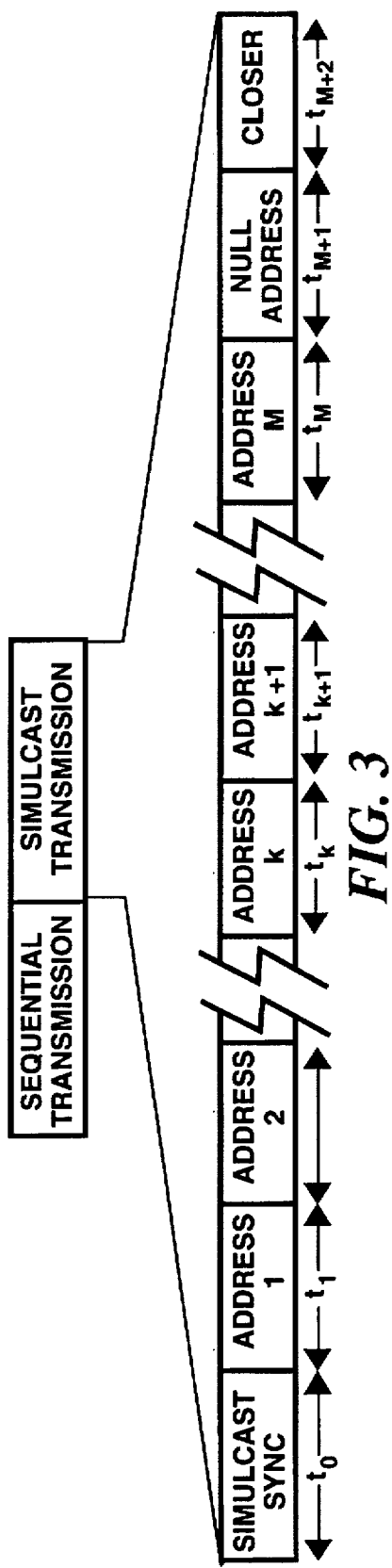

Once an entering subscriber unit 20 has stored the fixed information provided during the sequential transmission of the base station 15 having the strongest signal, the subscriber unit 20 waits for the beginning of the next simulcast transmission, as may be better understood by referring to FIG. 3. FIG. 3 is a transmission format preferably included within the simulcast transmission. According to the preferred embodiment of the present invention, at the beginning of each simulcast transmission, the central controller 10 provides to all of the base stations 15 the addresses of all of the subscriber units 20 for which the central controller 10 has received messages. Additionally, each base station 15 included within the messaging system simultaneously transmits, during time slot to, a sync word that is different than the sync word transmitted during the sequential transmission. The sync word is followed by the addresses of each of the subscriber units 20 that are to receive messages, i.e., the addresses provided by the central controller 10.

If, for example, N subscriber units 20 are included within the messaging system, and M subscriber units 20 have received messages, each base station 15 transmits the address associated with each of the M subscriber units 20. The M subscriber units 20 receive the addresses, and, during a predetermined time period, transmit a LACK such that each subscriber unit 20 that has received a message can be located within the messaging system. This LACK is transmitted to the base station 15 which was previously determined by the subscriber unit 20 to have the strongest signal during the sequential transmission. If one of the N subscriber units 20 does not recognize its address during the simulcast transmission, signifying that no message is intended for reception by the subscriber unit 20, the subscriber unit 20 preferably stores the fixed information transmitted by a base station 15 having the strongest signal during the next sequential transmission and again waits for its address during simulcast.

Because the subscriber units 20 respond only to the base station 15 from which the strongest signal was received, the subscriber units 20 communicating with a specific base station 15 are all preferably located within the coverage radius of the base station 15.

As mentioned above, each inbound message, including each LACK, transmitted by the subscriber units 20 to the base stations 15 is transmitted as a spread spectrum signal preferably centered about the center frequency of an allocated bandwidth. This spread spectrum signal is generated by using a PN sequence, i.e., a sequence of 0's and 1's, to spread a signal over the allocated bandwidth. According to the present invention, the PN sequence is generated by a sequence generator included in the subscriber unit 20. The sequence generator is initialized with a seed, such as the LACK seed which specifies the initial state of the shift register, as well as the register order information specifying the seed length and the tap information, which specifies feedback tap placement, provided by the base station 15 having the strongest signal.

For transmission of a given amount of data, i.e., bits, included within an inbound message, the subscriber unit 20 requires a time period $T_S$, referred to as a symbol time, which is dependent upon the bandwidth of the system and the length of the seeds, which determines the length of the sequences transmitted every symbol time. This symbol time $T_S$ is given by the formula $$T_S = \frac{2(2^n - 1)}{BW},$$

where n is the length of the seeds given in the register order information and BW is the bandwidth of the system. Preferably, the length of the seeds, n, is set to equal seven to achieve a desired processing gain $N_C$, i.e., number of chips per symbol, for the inbound messages transmitted from the subscriber units 20 to the base stations 15. The processing gain $N_C$ is given by the formula $N_C = 2^n - 1$. Therefore, if the bandwidth is 25 kHz, which is a typical frequency allocation, the time period $T_S$ in which an amount of data (a symbol), such as a LACK, is transmitted is approximately 10 ms.

Because the LACK transmitted by a subscriber unit 20 is dependent upon the LACK seed provided by the base station 15 determined to have the strongest signal, the targeted base station 15 is able to recognize the LACK transmitted by the subscriber unit 20. For example, if a subscriber unit 20 determines, during sequential transmission of the fixed information, that base station I has the strongest signal, the subscriber unit 20 stores the register order information, tap information, and seeds provided by base station II. Thereafter, at a predetermined time slot, which preferably has a duration of 10 ms, i.e., the symbol time, the subscriber unit 20 utilizes the register order information, tap information, and LACK seed provided by base station II to generate and transmit its LACK to base station II. Because other base stations 15 await LACKs generated by use of different LACK seeds, only base station II will detect the LACK sent by the subscriber unit 20. Other base stations 15, even if within range of the transmitting subscriber unit 20, will recognize that the LACK is intended for reception by a different base station. In this manner, each base station 15 is able to determine which subscriber units 20 are within its coverage area.

Additionally, because the seeds, such as the LACK and INIT seeds, are transmitted to the subscriber units 20 by the base stations 15 during each frame, the subscriber units 20 can conveniently relocate to another cell, i.e., another base station 15, within the messaging system. Thereafter, the subscriber unit 20 simply stores the seeds provided by the new base station 15 and resumes communication using the seeds transmitted by the base station 15.

Figure 4:
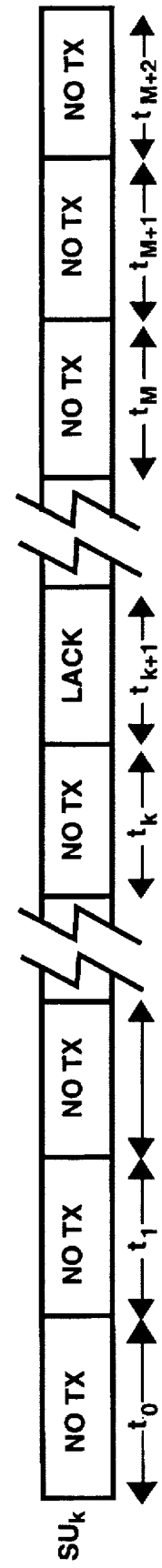

In accordance with the preferred embodiment of the present invention, each of the subscriber units 20 transmits its LACK during the time slot subsequent to the time slot in which its address was simulcast. FIG. 4 depicts a preferred transmission format of the kth subscriber unit, which is associated with address k. After obtaining synchronization during time slot to, subscriber unit k receives address k during time slot $t_k$. Thereafter, during time slot $t_{k+1}$, subscriber unit k transmits a LACK. The LACK is dependent upon the LACK seed transmitted by the base station determined by subscriber unit k to have the strongest signal strength during sequential transmission. Therefore, according to the present invention, the targeted base station 15 detects the LACK and is able to determine which subscriber unit 20 has transmitted the LACK.

Figure 5:
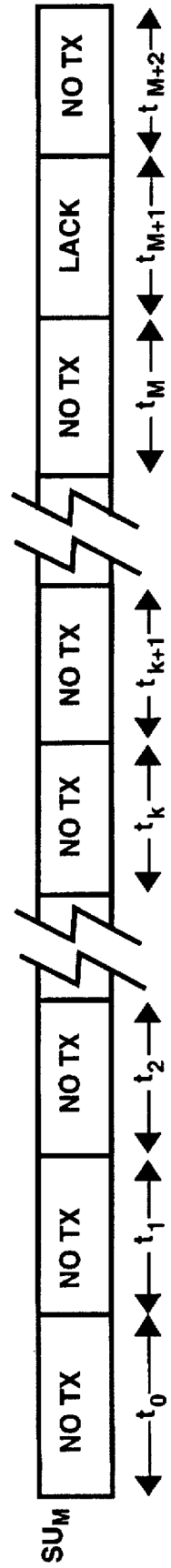

FIG. 5 illustrates the situation in which subscriber unit M transmits a LACK during time slot $t_{M+1}$. As described above, the LACK generated by subscriber unit M is dependent upon the LACK seed transmitted by the base station 15 determined by subscriber unit M to have the strongest signal strength during sequential transmission. During time slot $t_{M+1}$, in which a "null" address is transmitted, the targeted base station 15 receives the LACK from subscriber unit M. Subsequently, all of the base stations 15 transmit a "closer", which informs the subscriber units 20 that simulcast mode is ending.

As described above, the transmission of each message, i.e., symbol, such as a LACK, from a subscriber unit 20 requires approximately 10 ms, and the base station 15 simulcast transmission is 1200 bps binary FSK (frequency shift keyed). If, for instance, the addresses associated with the subscriber units 20 are 50-bit addresses, each address requires 41.67 ms for transmission from the base stations 15. Therefore, if 50-bit addresses are utilized, each subscriber unit 20 will actually be able to transmit four repeats of the 10 ms LACK during transmission of a subsequent address in the next time slot. As a result, errors in which the base station 15 "misses" a LACK are reduced because the energy in the repeatedly transmitted LACK is four times greater than if transmitted only a single time, resulting in better noise performance.

Returning to FIG. 2, after completion of the simulcast transmission, the base stations 15 provide, via the dedicated wirelines, the central controller 10 with the addresses of the subscriber units 20 from which LACKs were received. The central controller 10 then assigns an appropriate number of unique seeds to the base stations 15 for transmission as variable information. Additionally, the central controller 10 provides the messages received via the PSTN 30 (FIG. 1) to the base stations 15 to which the targeted subscriber units 20 transmitted LACKs. As described above, the central controller 10 may also, if necessary, change the register order information, tap information, or LACK and INIT seeds at this time.

Preferably, the variable information transmitted by each base station 15 comprises seeds provided by the central controller 10 and a message field. The seeds include message acknowledgment (MACK) seeds, which are utilized by the subscriber units 20 to acknowledge reception of a selective call message, and initialization data (INIT DATA) seeds. Preferably, each base station 15 transmits at least two MACK seeds to each subscriber unit 20 which is to receive a message transmitted by the base station 15 and from which the base station 15 received a LACK during simulcast transmission. After reception of a message included within the message field, as will be described below, the subscriber unit 20 utilizes a first MACK seed to generate a first message acknowledgment (MACK) or a second MACK seed to generate a second MACK recognized by the base station 15 as being different from the first MACK. The first MACK may, for instance, indicate that the subscriber unit 20 received the message, whereas the second MACK may indicate to the base station 15 that the transmitted message had too many errors and should be re-transmitted in a subsequent message field. Alternatively, the base station 15 could provide only a single MACK seed to the subscriber units 20 which are to receive a message. The transmission of a MACK, generated through use of the MACK seed, could then indicate that the message was received, and, conversely, no response by a subscriber unit 20 could indicate that the message should be retransmitted.

If, for instance, base station I receives LACKs from two subscriber units 20, e.g., subscriber unit a and subscriber unit b, base station I provides the addresses of the two subscriber units 20 to the central controller 10. The central controller 10 then provides messages intended for reception by each of the two subscriber units 20 to base station I. Additionally, MACK seeds are provided to base station I for each of the two subscriber units 20 that is to receive a message. Preferably, if subscriber units a and b are to receive messages and have provided LACKs to base station I, the central controller 10 provides four unique MACK seeds, each of which has an order n, to base station I after completion of the simulcast transmission. During transmission of the variable information, base station I transmits address a, which is associated with subscriber unit a, followed by a first MACK seed, referred to as $MACK_{a,0}$, and a second MACK seed, referred to as $MACK_{a,1}$. Base station I then similarly transmits address b followed by the seeds $MACK_{b,0}$ and $MACK_{b,1}$. In this manner, each of the subscriber units 20 which transmitted a LACK to base station I receives two MACK seeds with which to respond to a message included within the following message field.

As described above, the sequential transmission is transmitted by the base stations 15 at a data rate of 12 kbps, which is ten times faster than the data rate of the simulcast transmission. Therefore, if 50-bit addresses are used within the messaging system, each address will be transmitted by the base stations 15 in approximately 4.2 ms. Similar to a LACK, however, a MACK requires a transmission time of 10 ms (with n=7 and BW=25 kHz). As a result, the MACK is preferably not transmitted until after a base station 15 has completed transmission of the message field, as may be better understood by referring to FIGS. 6, 7, and 8.

Figures 6, 7, 8:
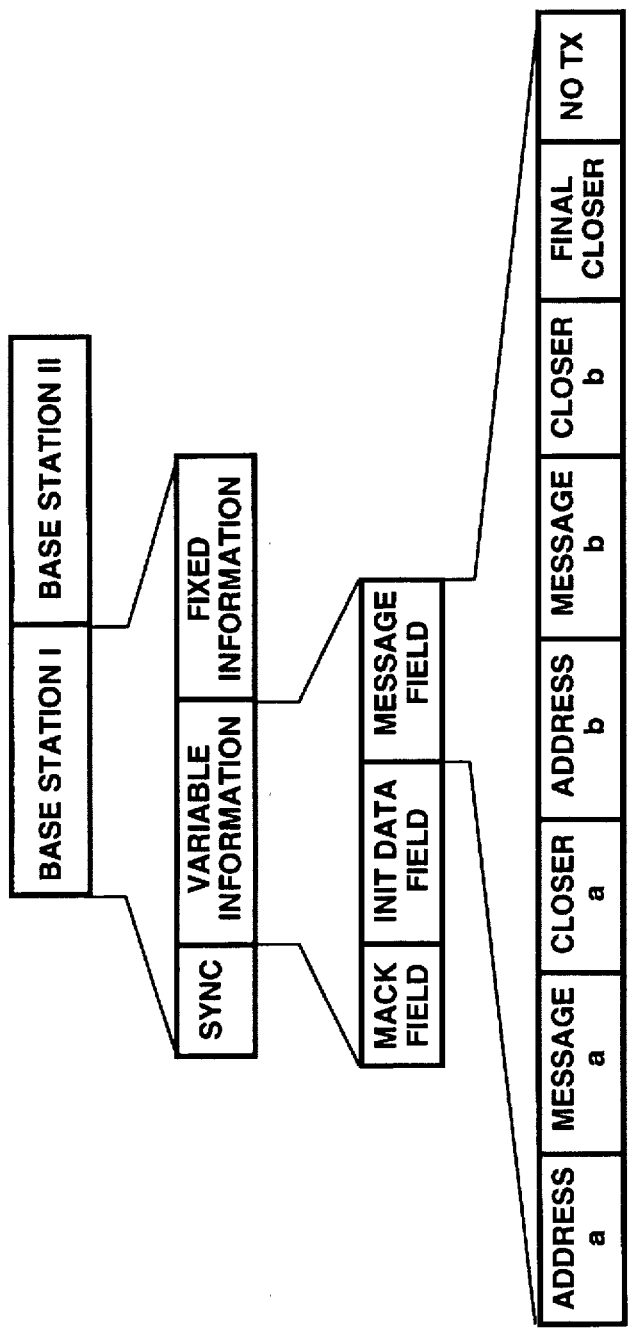

FIG. 6 shows an example of the format of the message field for a base station 15, such as base station I. According to the present invention, all of the base stations 15 within the messaging system employ a similar format during transmission of the message fields included within the variable information. Using the example described above, subscriber units a and b are shown as receiving messages from base station I, which first transmits address a followed by the message intended for reception by subscriber unit a and a closer indicating to subscriber unit a that transmission of the message is completed. Base station I thereafter transmits address b followed by the message intended for reception by subscriber unit b and a closer. According to the present invention, base station I then transmits a final closer to indicate to subscriber units a and b that transmission of the message field is completed.

In an alternate embodiment of the present invention, the transmission of the MACK seeds to a specific subscriber unit 20 could occur immediately after transmission of the subscriber unit address within the message field rather than in the MACK field (FIG. 2). In such an alternate embodiment, the subscriber unit 20 would receive the address and subsequently store the MACK seeds provided by the base station 15. Thereafter, the message would be received by the subscriber unit 20, which would generate a MACK as described below.

FIGS. 7 and 8 show the responses, i.e., the MACKs, transmitted by subscriber units a and b in accordance with the preferred embodiment of the present invention. As shown, subscriber unit a, after reception of message a, generates a MACK through use of either $MACK_{a,0}$ or $MACK_{a,1}$. The MACK generated using $MACK_{a,0}$ may, for example, indicate that message a has been received without error. Conversely, the MACK generated using $MACK_{a,1}$ may indicate that message a should be re-transmitted at a later time. Similarly, subscriber unit b transmits an appropriate MACK, generated by using either $MACK_{b,0}$ or $MACK_{b,1}$. In accordance with the preferred embodiment of the present invention, the MACKs are transmitted simultaneously by subscriber units a and b after transmission of the final closer by base station I at the beginning of a subsequent 10 ms time slot. Alternatively, the MACKs could be transmitted by each subscriber unit 20 immediately after reception of a message, i.e., during the next available 10 ms time slot. Base station I is able to distinguish between the two responses because the MACKs have been generated using different MACK seeds provided by base station I.

If, after transmission of a message, a base station 15 does not receive a MACK from the targeted subscriber unit 20, the base station 15 may retransmit the message during a subsequent frame. Alternatively, the base station 15 might notify the central controller 10 that the targeted subscriber unit 20 has not transmitted a MACK, in response to which the central controller 10 may store the message until the targeted subscriber unit 20 has again sent a LACK to one of the base stations 15.

In accordance with the preferred embodiment of the present invention, the subscriber units 20 may also initiate communication with the base stations 15. As described above, each of the base stations 15 transmits, during sequential transmission, a unique INIT seed. The subscriber units 20 store the INIT seed transmitted by the base station 15 which was determined to have the strongest signal during the previous sequential transmission. Thereafter, if a subscriber unit 20 needs to initiate communication with the base station 15 which transmitted the stored INIT seed, the subscriber generates, through use of the INIT seed, taps, and register order information, an INIT signal for transmission to the base station 15 during any 10 ms time slot. In response to reception of an INIT signal, the base station 15 tags the INIT signal with a real time value indicating the time slot in which the INIT signal was received. Thereafter, the base station 15 transmits INIT DATA seeds to subscriber units 20 from which the base station 15 has received INIT signals. These INIT DATA seeds are transmitted in an INIT DATA field which preferably follows the field in which the MACK seeds are assigned and which is also included in the variable information.

According to the present invention, each subscriber unit 20 that has previously transmitted an INIT signal to a base station 15 is assigned L INIT DATA seeds, where L is an integer preferably given by the equation $L=2^j$, and j is a positive integer. Therefore, if one of L inbound messages is to be transmitted by a subscriber unit 20 during a symbol time of approximately 10 ms, the number of bits that can be included within a symbol time, $T_S$, is given by the equation $N_{bits}=\log_2 L$. It can be seen, then, that, as the number of NIT DATA seeds assigned to a subscriber unit 20 increases, the amount of information included within the symbol time, $T_S$, also increases. Thus, as the number of NIT DATA seeds assigned to a subscriber unit 20 increases, an inbound message having a fixed length, i.e., an inbound message including a fixed number of bits, can be transmitted by the subscriber unit 20 more quickly, thereby increasing the throughput of the inbound messaging system for that subscriber unit 20.

Figure 9:
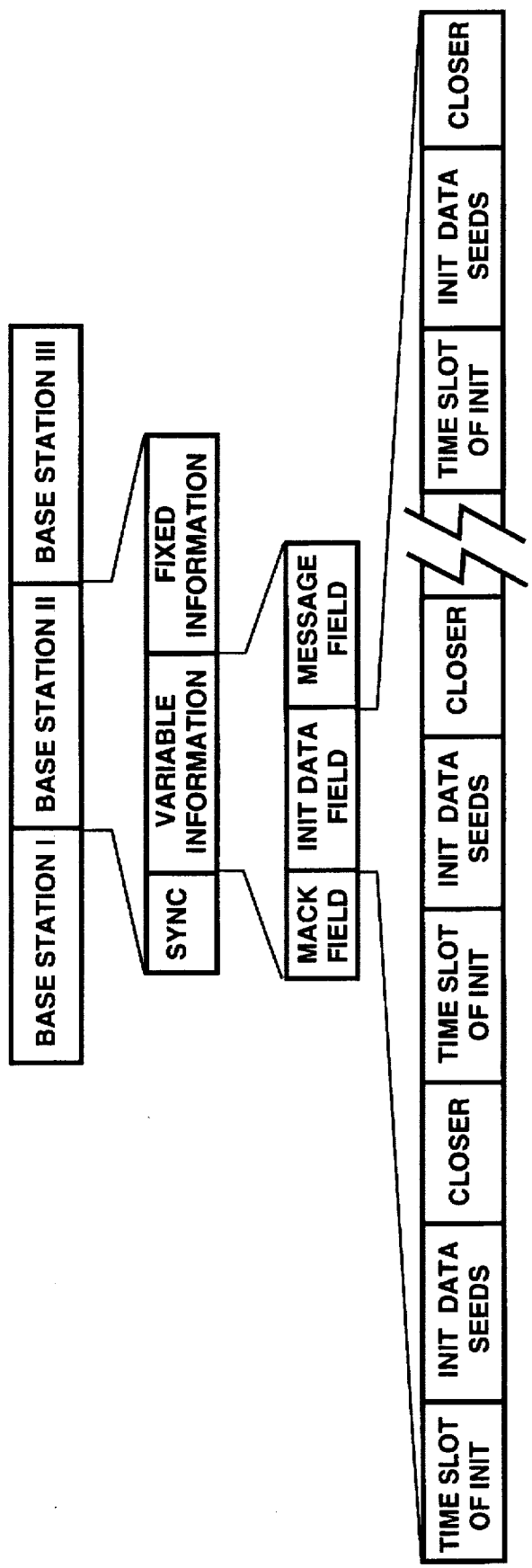

One method in which the assignment of INIT DATA seeds can be accomplished is for the central controller 10 to assign all available INIT DATA seeds to a base station 15 that is currently transmitting the variable information and to which at least one subscriber unit 20 has transmitted an INIT signal, as may be better understood by referring to FIG. 9.

FIG. 9 is a diagram illustrating the transmission of an INIT DATA field by a base station 15, such as base station II, which has previously received INIT signals from K subscriber units 20, where K is equal to or greater than one. Preferably, the base station 15 communicates over the wireline to the central controller 10 prior to transmission of the INIT DATA field, such as during the MACK field, to inform the central controller 10 of the number of subscriber units 20 which have previously transmitted INIT signals to the base station 15. Thereafter, the central controller 10 determines which of the INIT DATA seeds are available and assigns the available INIT DATA seeds to the base station 15. The base station 15 then divides the available INIT DATA seeds evenly between the K subscriber units 20 for transmission in the WIT DATA field. It may be appreciated, however, that if no subscriber units 20 have initiated communication by transmission of WIT signals, the central controller 10 need provide no INIT DATA seeds to the base station 15 and the base station 15 need not transmit WIT DATA seeds to any subscriber units 20.

In accordance with the preferred embodiment of the present invention, if subscriber units 20 have provided INIT signals to the base station 15, the base station 15 transmits the INIT DATA seeds to the subscriber units 20 in the order in which the base station 15 received the INIT signals from the subscriber units 20. Rather than transmitting addresses to identify the subscriber units 20, however, the base station 15 transmits the values corresponding to the time slots in which the INIT signals were received because the subscriber unit addresses are unknown. Therefore, each of the subscriber units 20 which has previously transmitted an INIT signal to the base station 15 will recognize the transmitted time slot value and will store the appropriate INIT DATA seeds.

Accordingly, the base station 15 first transmits, in the INIT DATA field, the time slot of a first received INIT signal, i.e., time slot 1. The subscriber unit 20 that sent an INIT signal during time slot 1 recognizes the transmitted time slot and prepares to receive NIT DATA seeds. Thereafter, the base station 15 transmits a number of INIT DATA seeds for reception by the subscriber unit 20 that transmitted an INIT signal during time slot 1. As mentioned above, this number of INIT DATA seeds is preferably equal to the number of available INIT DATA seeds divided by the K subscriber units 20 that previously sent INIT signals to the base station 15. Because the number of INIT DATA seeds provided to a subscriber unit 20 can vary, the base station 15 further transmits a closer after transmitting INIT DATA seeds to each subscriber unit 20 to indicate that the transmission of INIT DATA seeds to a given subscriber unit 20 is complete.

By way of example, if three subscriber units 20 transmitted INIT signals to the base station 15, and the central controller 10 provided twenty-four available INIT DATA seeds to the base station 15, each subscriber unit 20 will receive eight INIT DATA seeds from the base station 15 during the INIT DATA field. As a result, each of the three subscriber units 20 will be able to send three bits of data to the base station 15 during a symbol time, which is preferably 10 ms. If, on the other hand, twelve INIT DATA seeds are available, each of the three subscriber units 20 will receive four INIT DATA seeds and will be able to send two bits of data in each symbol time. Therefore, it is desirable to provide as many INIT DATA seeds as possible to the subscriber units 20 from which inbound messages will be transmitted.

Preferably, the subscriber units 20 begin sending inbound messages to the base station 15 as soon as the NIT DATA seeds have been received from the base station 15. Each inbound message is, in accordance with the preferred embodiment of the present invention, followed by an "endof-message" indicator, in response to which the base station 15 notifies the central controller 10 that the INIT DATA seeds used by a subscriber unit 20 to transmit an inbound message are no longer in use by the subscriber unit 20.

However, a situation could arise in which a subsequently transmitting base station 15 might request a large number of INIT DATA seeds before they are available from the central controller 10. This could occur, for example, if the subsequently transmitting base station 15 requests INIT DATA seeds before any of the subscriber units 20 to which all of the previously available INIT DATA seeds are assigned have completed their inbound transmissions. To reduce the risk of such a situation occurring, the central controller 10 could provide only a certain percentage of the available INIT DATA seeds to a requesting base station 15 and hold the others in reserve, rather than providing every available INIT DATA seed to a requesting base station 15. Therefore, the reserve INIT DATA seeds could be provided to the subsequently transmitting base station 15 in situations in which all of the subscriber units 20 that previously received INIT DATA seeds are still transmitting inbound messages.

In accordance with the preferred embodiment of the present invention, a subscriber unit 20 is able to transmit only a certain number of bits included within an inbound message during each symbol time, where the number of bits is determined by the number L of INIT DATA seeds assigned to the subscriber unit 20. These bits, given by the equation $N_{bits}=\log_2 L$, are transmitted as a direct sequence spread spectrum signal preferably centered about the center frequency of the allocated bandwidth. In an alternate embodiment of the present invention, however, the subscriber units 20 could transmit at more than a single frequency. For instance, in the case where two offset frequencies, such as +/−500 Hz, are used, the subscriber unit 20 could transmit one of two spread spectrum signals centered at the center frequency +/−500 Hz. Therefore, the subscriber unit 20 could conveniently transmit twice the number of bits per symbol time. In the more general case where any number of frequencies, rather than only the single center frequency, are used, the number of bits per symbol time is given by the equation $N_{bits}=\log_2(N_f L)$, where $N_f$ is a positive integer representing the number of possible frequencies at which the subscriber unit 20 is able to transmit.

Alternatively, data could be transmitted in the form of different PN sequences at a single frequency or in the form of a PN sequence at different frequencies. These cases are represented by the formulas $N_{bits}=N_f(\log_2 L)$ and $N_{bits}=L(\log_2 N_f)$, respectively.

Although, in accordance with the preferred embodiment of the present invention, the subscriber units 20 are able to initiate communication with the base stations 15, other alternate embodiments of the present invention are envisioned in which the subscriber units 20 are simply able to provide location and message acknowledgments (LACKs and MACKs) to the base stations 15. In such alternate embodiments, it would be unnecessary for the base stations 15 to transmit the INIT seeds located in the fixed information or the INIT DATA field included in the variable information.

Figure 10:
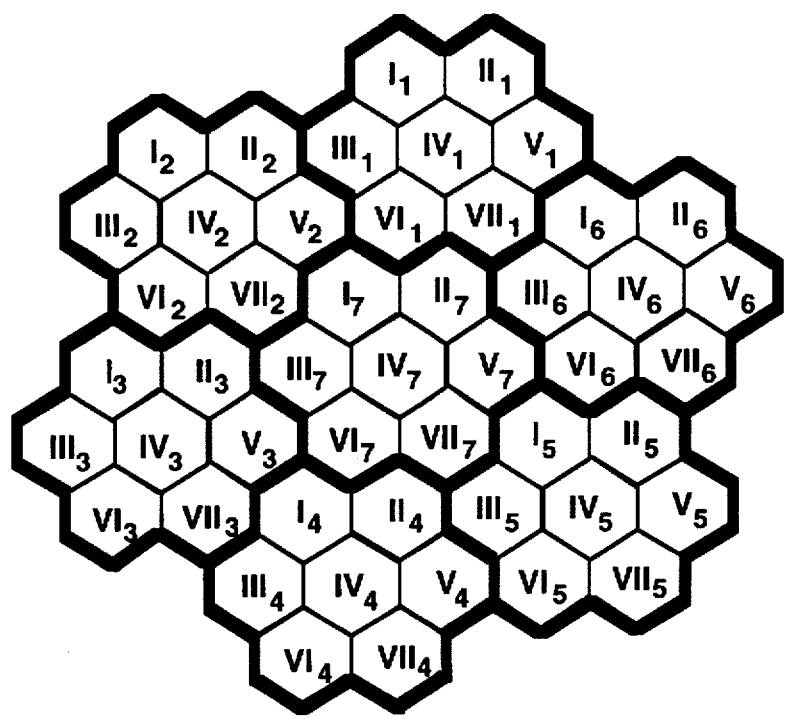
FIG. 10 is a diagram illustrating an arrangement of re-use groups utilized by the messaging system of FIG. 1 in accordance with the preferred embodiment of the present invention.

Referring next to FIG. 10, a possible arrangement of base stations 15 within the messaging system is depicted. As shown, the messaging system comprises a plurality of cells grouped into clusters. The illustration shows a seven cells per cluster arrangement, which represents one of the several examples of cluster types known to those skilled in the art. Each cell comprises a pre-defined area for communication in which one base station 15 is located, and all similarly numbered cells are located at a fixed distance from all other similarly numbered cells. This distance between cells is determined by the cluster size and the radii of the cells.

In accordance with the preferred embodiment of the present invention, the base stations 15 are grouped in seven (7) "re-use" groups of seven (7), and the base stations 15 within each re-use group are labeled with Roman numerals I–VII. The subscripts to the Roman numerals designate the group number. For example, the fifth base station in the fifth group is labeled $V_5$. If the transmitting power of each of the subscriber units 20 is adjusted correctly, the seeds (LACK, MACK, INIT, and INIT DATA) transmitted by some of the base stations 15 may be re-used by other base stations 15 within the messaging system. For example, the transmitting power of the subscriber units 20 might be adjusted such that subscriber units 20 associated with base station I within each group can re-use the same seeds. In this manner, if a base station 15 within a first re-use group requests INIT DATA seeds, for instance, from the central controller 10 when all of the INIT DATA seeds are unavailable, the central controller 10 can determine if any of the INIT DATA seeds are currently assigned to the base station 15 of the same number within a different re-use group. If so, those INIT DATA seeds could be assigned to, and thus re-used by, the requesting base station 15, thereby advantageously providing for an increased number of subscriber units 20 that may transmit during a single time slot.

Central Controller Description

Figure 11:
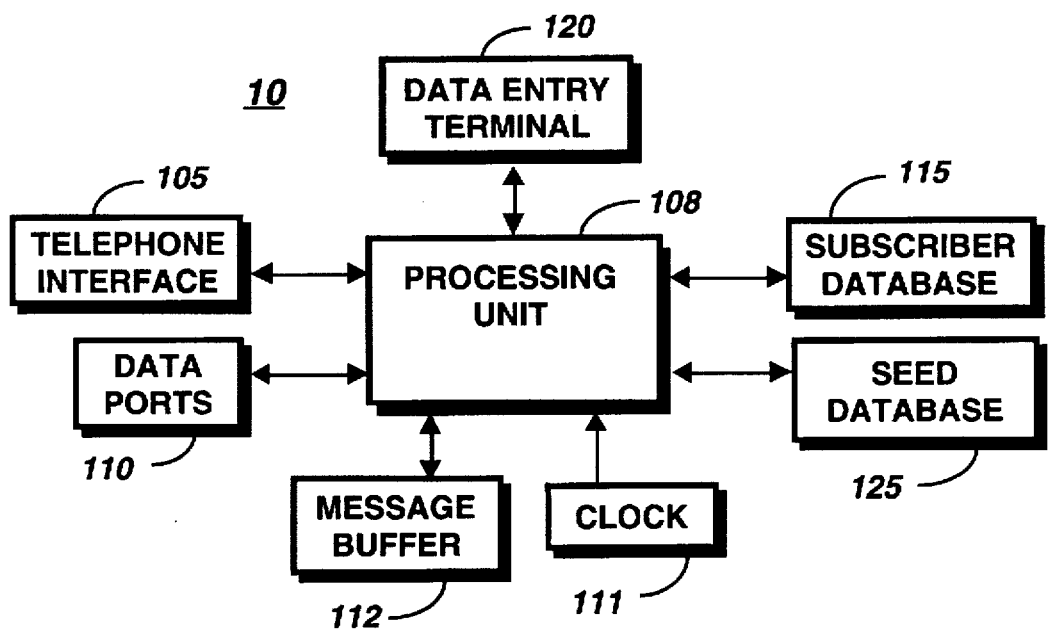
FIG. 11 is an electrical block diagram of a central controller included in the messaging system of FIG. 1 in accordance with the preferred embodiment of the present invention.

FIG. 11 is an electrical block diagram of the central controller 10, in accordance with the preferred embodiment of the present invention, for controlling the operation of the base stations 15 (FIG. 1) included within the CDMA messaging system. The central controller 10 preferably comprises a telephone interface 105 for coupling the PSTN 30 (FIG. 1) to a processing unit 108 such that the processing unit 108 receives message data, intended for reception by subscriber units 20, from the PSTN 30. Additionally, the central controller 10 includes a plurality of data ports 110 coupled to the processing unit 108 for transmitting and receiving data from the base stations 15, preferably via dedicated wireline. A clock 111 further coupled to the processing unit 108 provides real time values utilized by the processing unit 108 for generating timing signals to activate the transmissions, both simulcast and sequential, from the base stations 15.

When a call is received, the processing unit 108 handles the processing of the message. The processing unit 108 is preferably a microcomputer, such as an MC68000 or equivalent, which is manufactured by Motorola, Inc., and which runs various pre-programmed routines for controlling such central controller operations as voice prompts directing a caller to enter a message, etc. Alternatively, the processing unit 108 could be implemented using hard-wired logic capable of performing the described processing functions.

Upon reception of a message, the processing unit 108 stores the message in a message buffer 112 and references information stored in a subscriber database 115 to determine how the received message is to be processed. The subscriber database 115 includes, for example, information such as addresses assigned to the subscriber units 20 included within the messaging system, message type associated with the address, and information related to the status of a subscriber unit 20, such as active or inactive for failure to pay a bill. A data entry terminal 120 is provided which couples to the processing unit 108 and which is used for purposes such as entry, updating, and deletion of information stored in the subscriber database 115, for monitoring system performance, and for obtaining such information as billing information.

Further coupled to the processing unit 108 is a seed database 125 in which is stored a number of seeds. Preferably, the seed database 125 includes at least one LACK and INIT seed for each base station 15 in the messaging system. Alternatively, if re-use groups are formed within the messaging system, as described in FIG. 10, the seed database 125 could merely include at least one LACK and INIT seed for each base station 15 within a re-use group. Therefore, given a finite number of seeds within the messaging system, a greater number of subscriber units 20 could transmit during a single time slot. Additionally, the seed database 125 further includes MACK and INIT DATA seeds for use by subscriber units 20 included within the messaging system.

As described above, the processing unit 108 generates timing signals which are relayed over the data ports 110 to direct each base station 15 to begin and end transmissions in the simulcast and sequential modes. At the beginning of each simulcast transmission within a frame, the processing unit 108 retrieves the addresses of any subscriber units 20 for which messages are stored in the message buffer 112. The processing unit 108 then relays the addresses and a simulcast activation signal over the data ports 110 to the base stations 15. Thereafter, the base stations 15 simulcast the addresses and receive LACKs from the operational subscriber units 20 which are operational, i.e., powered up and operating correctly, and located within range of the base stations 15. At the end of the simulcast transmission, each base station 15 transmits to the central controller 10 the addresses of the subscriber units 20 from which LACKs were received, in response to which the processing unit 108 retrieves the messages from the message buffer 112 for transmission to the appropriate base stations 15. Additionally, the processing unit 108 preferably assigns to the appropriate base station 15 at least two MACK seeds for each subscriber unit 20 from which a LACK was received.

In accordance with the preferred embodiment of the present invention, each base station 15, prior to transmission of its INIT DATA field, communicates with the central controller 10 to request INIT DATA seeds when one or more subscriber units 20 have transmitted INIT signals to the base station 15. This communication, which preferably occurs at different times for each of the base stations 15, conveys the number of subscriber units 20 from which the base station 15 has received INIT signals. In response to reception of the request for seeds, the processing unit 108 consults the seed database 125 to determine the number of available INIT DATA seeds. Preferably, unless a percentage of the INIT DATA seeds have been designated as reserve seeds, all of the available INIT DATA seeds are provided to the requesting base station 15 for transmission to the subscriber units 20 that have sent INIT signals to the requesting base station 20. In this manner, during times when only a small number of subscriber units 20 have initiated communication, a greater number of INIT DATA seeds can be provided to each of the subscriber units 20. Therefore, the subscriber units 20 are able to transmit a greater amount of data to a base station 15 within a single symbol time slot. It may be appreciated that this allocation of INIT DATA seeds provides for a method in which the inbound throughput for individual subscribers may be conveniently varied depending upon system traffic. Accordingly, when system traffic is light, i.e., when only a small number of subscriber units 20 have transmitted INIT signals, those subscriber units 20 are assigned a greater number of INIT DATA seeds and are thus able to transmit data more quickly.

Figure 12:
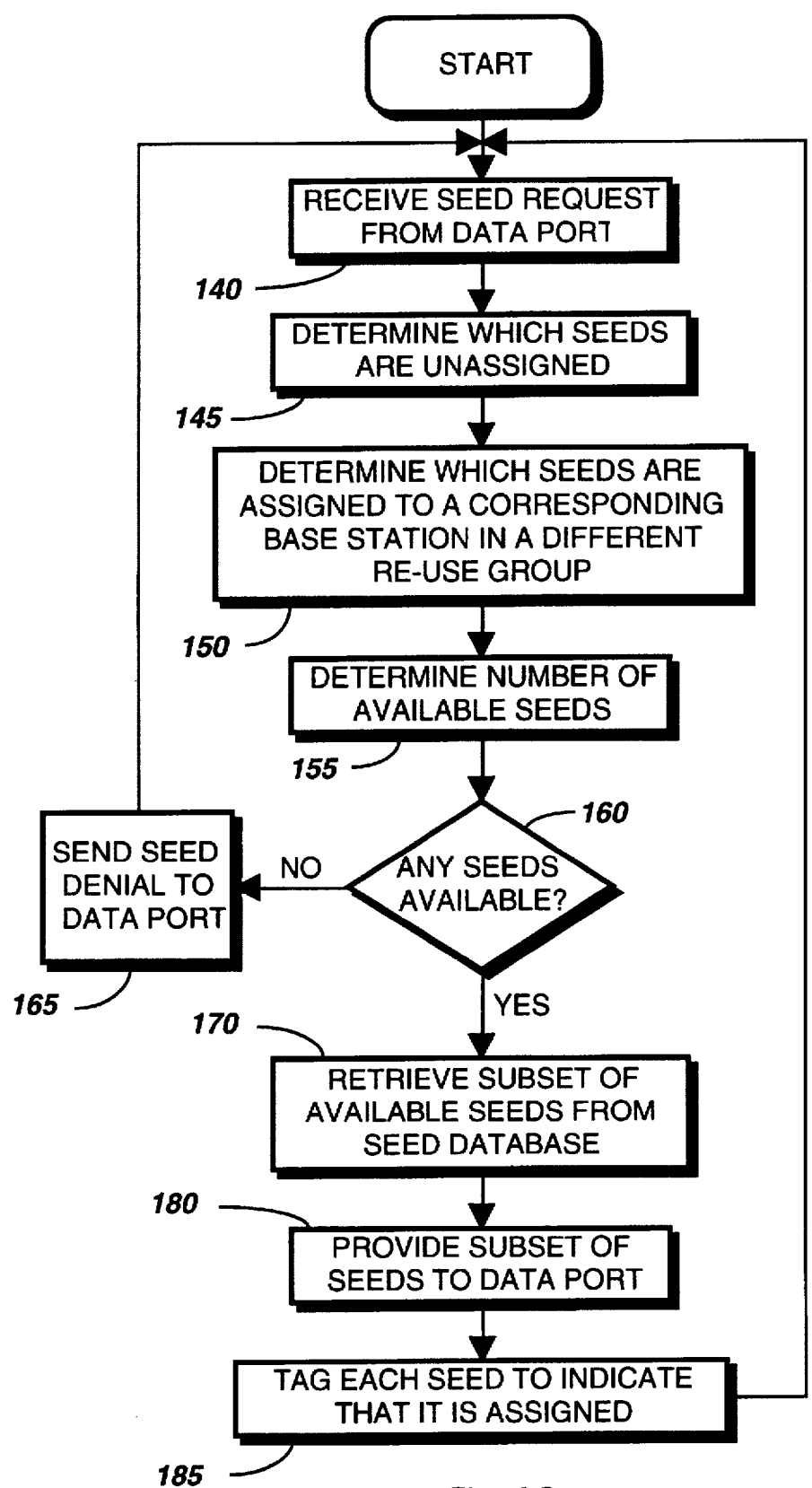
FIG. 12 is a flowchart illustrating the operation of the processing unit included in the central controller of FIG. 11 in accordance with the preferred embodiment of the present invention.

This process may be understood more clearly by referring to FIG. 12, which is a flowchart illustrating a process by which the processing unit 108 of the central controller 10 could assign INIT DATA seeds to the base stations 15. In accordance with the preferred embodiment of the present invention, the processing unit 108 receives, at step 140, a seed request from one of the data ports 110. The seed request is transmitted to the data port 110 from a requesting base station and includes information by which the number of subscriber units 20 that are requesting communication may be detected. Thereafter, at step 145, the processing unit 108 consults the seed database 125 (FIG. 11) to identify the seeds that are currently unassigned to any of the base stations 15 within the messaging system. When re-use groups are utilized within the messaging system, the processing unit 108, at step 150, further determines whether any seeds are currently assigned to any corresponding base stations 15 included in different re-use groups, subsequent to which the processing unit 108, at step 155, determines the number of available seeds. When re-use groups are not utilized in the messaging system, the number of available seeds simply equals to the number of unassigned seeds. Alternatively, when re-use groups are utilized, the number of available seeds corresponds to the number of any seeds assigned to corresponding base stations 15 in different re-use groups as well as the number of unassigned seeds.

If, at this point, no seeds are available, at step 160, the processing unit 108 may generate a "seed denial" signal for transmission, at step 165, to the requesting base station via the data port 110. If, on the other hand, seeds are determined to be available, the processing unit 108 retrieves, at step 170, a subset of the available seeds from the seed database 125. As described above, this subset may include every available seed or, if the central controller 10 is programmed to withhold a certain percentage of seeds, the subset may include the number of available seeds less the percentage. In either situation, the subset of available seeds is, at step 180, provided to the data port 110 for transmission to the requesting base station for use as INIT DATA seeds. Thereafter, at step 185, the processing unit 108 preferably tags, in the subscriber database 115, each of the subset of available seeds to indicate that they are assigned to a base station 15. Thereafter, when any of the seeds are no longer being used by a subscriber unit 20 to transmit to the requesting base station, the requesting base station sends a signal to indicate that the seed is no longer in use. In response to reception of the signal, the processing unit 108 tags the seed to indicate that it is once again unassigned.

As mentioned above, the available INIT DATA seeds may also, if reuse groups are included within the messaging system, include INIT DATA seeds currently assigned to a base station 15 in a different re-use group and having the same base station number as that of the requesting base station 15. For example, base station I may be assigned INIT DATA seeds which are currently assigned to other base station I's included within different re-use groups in the messaging system. Preferably, the seeds, i.e., the MACK and INIT DATA seeds, included within the variable information are again tagged as "available" when the central controller 10 is notified by the base stations 15 that the seeds are no longer needed for use by the subscriber units 20.

Subscriber Unit Description

Figure 13:
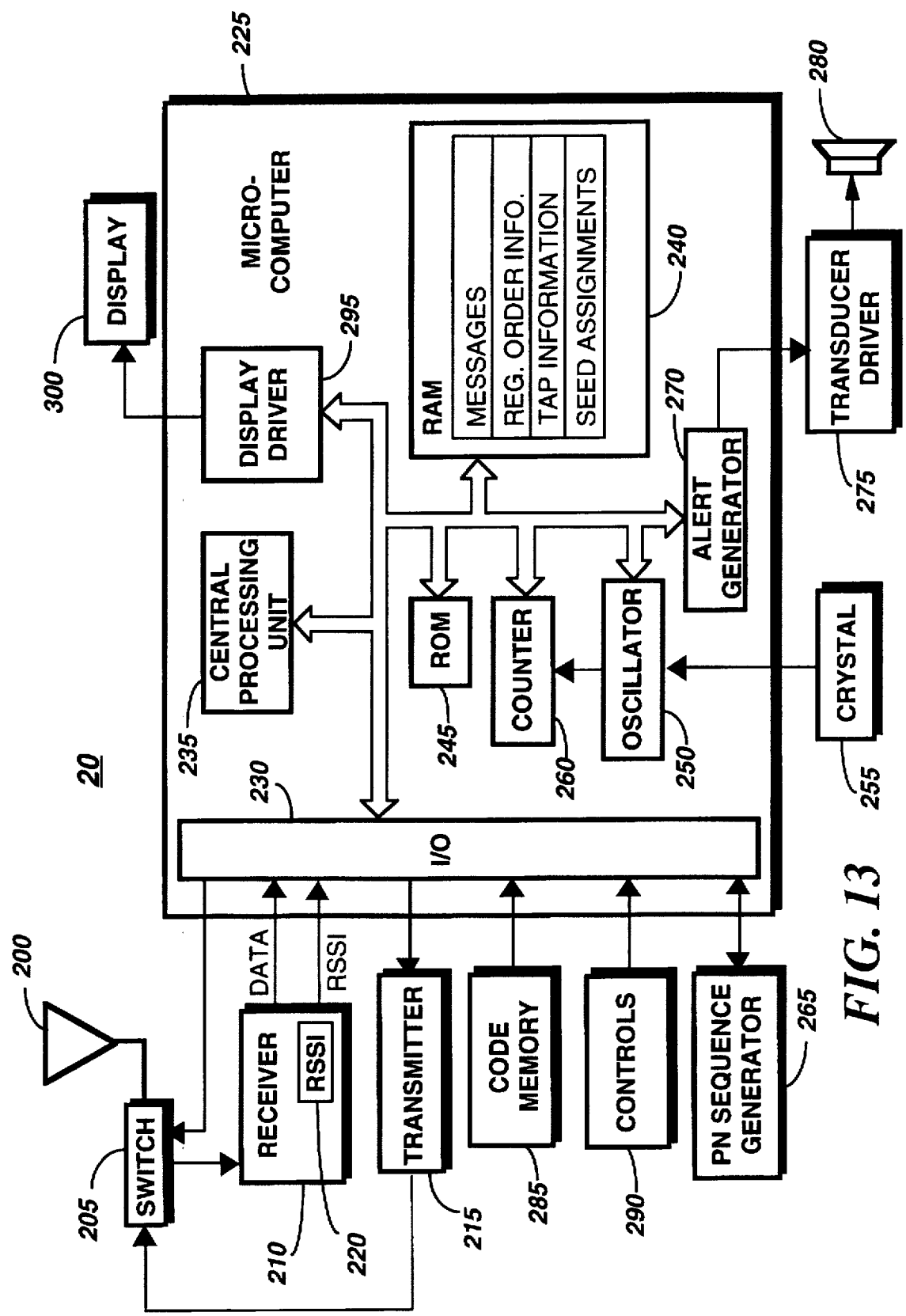
FIG. 13 is an electrical block diagram of a subscriber unit included in the messaging system of FIG. 1 in accordance with the preferred embodiment of the present invention.

With reference to FIG. 13, a block diagram of a subscriber unit 20 in accordance with the preferred embodiment of the present invention is depicted. The subscriber unit 20 comprises an antenna 200 for transmitting and receiving radio frequency (RF) signals and a switch 205 coupling the antenna 200 to a receiver 210 and a transmitter 215. Preferably, the switch 205 defaults to a "receive" mode, in which signals are received by the antenna 200 and provided to the receiver 210, until reception of a "transmit" signal, in response to which the switch 205 enables the transmission of a signal provided by the transmitter 215.

As is well known to one skilled in the art, the receiver 210 demodulates a received RF signal to recover data therefrom. Additionally, according to the present invention, the receiver 210 includes a received signal strength indicator (RSSI) 220 for determining the strength of the received signal. The signal strength measurement and the data are provided to a decoder/controller, such as a microcomputer 225, through an input/output (I/O) bus 230. In accordance with the preferred embodiment of the present invention, the demodulated data is processed by a central processing unit (CPU) 235 internal to the microcomputer 225 to decode addresses, time slot values, messages, seeds, and data included within the fixed information transmitted by the base stations 15 (FIG. 1). The decoded information is subsequently stored in a random access memory (RAM) 240.

In addition to the RAM 240, the microcomputer 225 includes a read only memory (ROM) 245, such as an EEPROM (electrically erasable programmable read only memory), which stores subroutines controlling the operation of the subscriber unit 20. Further included in the microcomputer 225 is an oscillator 250 for generating timing signals utilized in the operation of the microcomputer 225. A crystal 255, or a crystal oscillator, is coupled to the oscillator 250 to provide a reference signal for establishing timing of the microcomputer 225. A counter 260, internal to the microcomputer 225 and coupled to the oscillator 250, provides programmable timing functions which are utilized in controlling the operation of the microcomputer 225.

In accordance with the preferred embodiment of the present invention, a pseudo-noise (PN) sequence generator 265 is coupled to the microcomputer 225 through the I/O bus 230. The PN sequence generator 265 is preferably a shift register which, when provided with tap information and a seed of length n, generates a PN sequence of length $2^n-1$. The tap information may, for example, include information by which a plurality of programmable switches within the shift register may be set. As mentioned above, the seed length n is preferably equal to seven to achieve an appropriate processing gain for transmitted signals. Therefore, the PN sequence generator 265 generates PN sequences having a length of 127 chips when the seed length is seven.

In response to reception of a message intended for the subscriber unit 20, the CPU 235 signals an alert generator 270, which enables a transducer driver 275 to power a transducer 280. The transducer 280 is switched on and off, with reference to the oscillator 250, at a frequency dictated by a programmed frequency value stored in a code memory 285, which is coupled to the microcomputer 225 through the I/O bus 230. In this manner, the transducer 280 generates, for an amount of time programmed into the code memory 285, an audible alert to announce reception of the message to a user. Thereafter, the user may choose to be presented with the message by manipulating user-actuated controls 290 coupled to the microcomputer 225 through the I/O bus 230. In response to the user-initiated signal from the controls 290, the CPU 235 retrieves the message from the RAM 240 for subsequent transmission to a display driver 295 included within the microcomputer 225. The display driver 295 powers a display 300 and transfers the message to the display 300 for subsequent presentation.

Figure 14:
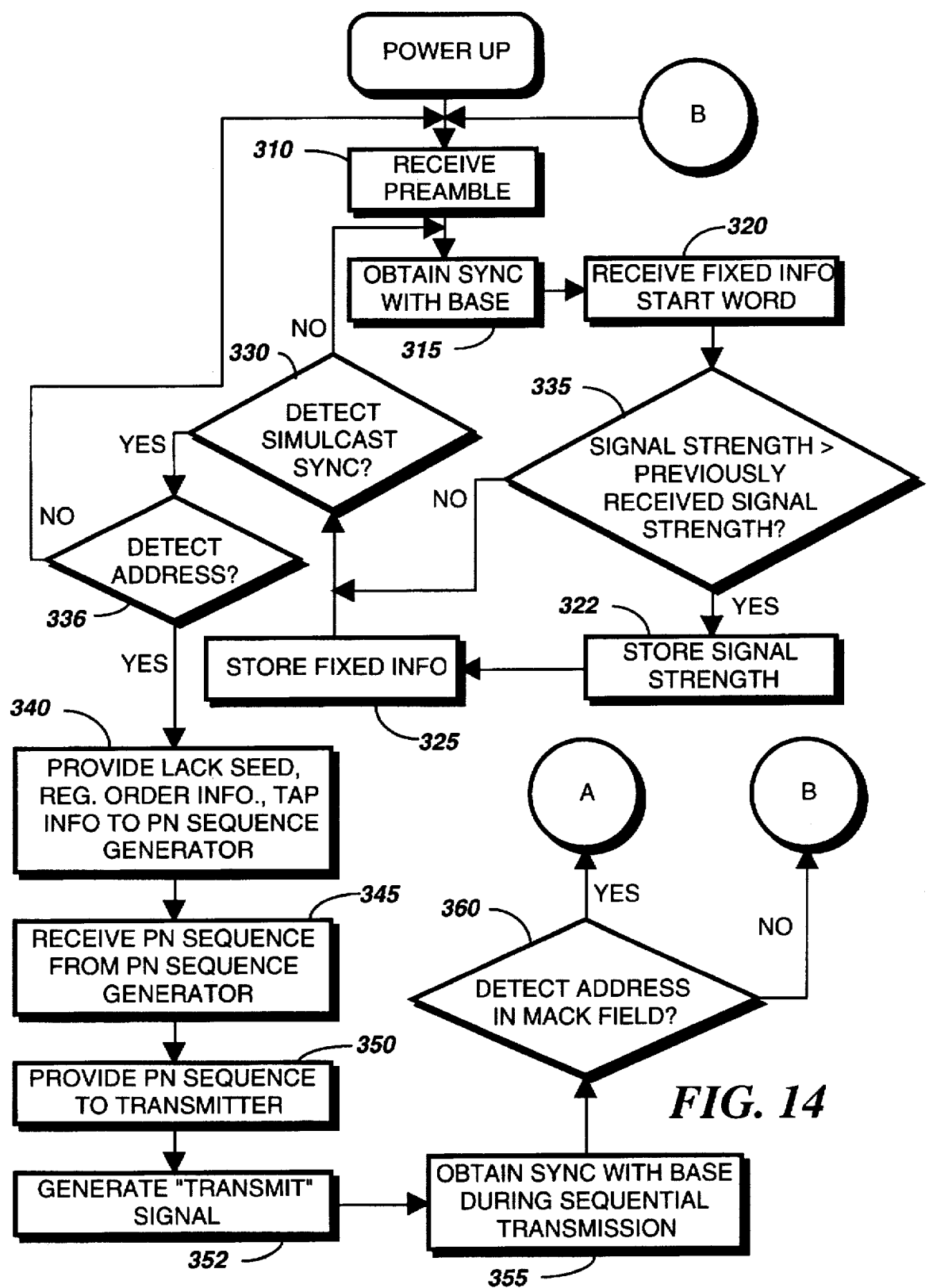
FIGS. 14 and 15 are flowcharts depicting the operation of the microcomputer included in the subscriber unit of FIG. 13 in accordance with the preferred embodiment of the present invention.
Figure 15:
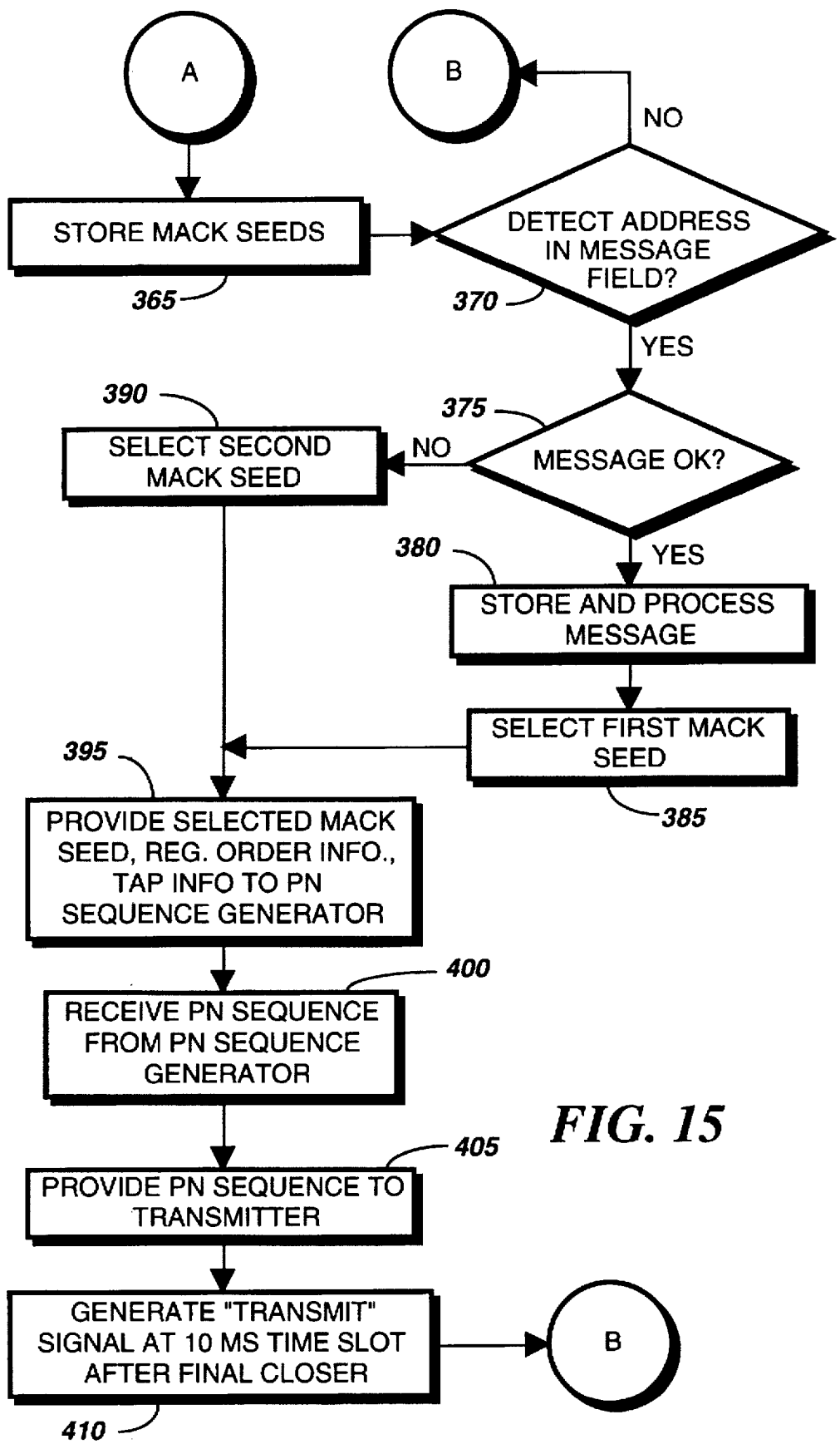

Referring next to FIGS. 14 and 15, flowcharts depict the operation of the microcomputer 225 (FIG. 13) when the subscriber unit 20 is powered up. In accordance with the preferred embodiment of the present invention, the CPU 235 (FIG. 13) ignores all information included in received radio frequency (RF) signals until reception, at step 310, of a preamble indicating the beginning of a frame. Thereafter, the CPU 235 obtains synchronization, at step 315, with a sequentially transmitting base station 15. Preferably, the CPU 235 ignores variable information transmitted by the base station 15 and waits, at step 320, for reception of a fixed information start word, subsequent to which the CPU 235 stores the signal strength measurement provided by the RSSI 220 (FIG. 13) and the fixed information transmitted by the base station 15, at steps 322, 325, in the RAM 240. In accordance with the preferred embodiment of the present invention, the fixed information comprises register order information, which specifies the seed length n, and tap information which is utilized by the microcomputer 225 to initialize the PN sequence generator 265. The fixed information further comprises LACK and INIT seeds, as mentioned above.

After storage of the signal strength and the fixed information, the CPU 235 determines whether the sequential transmission of fixed information is complete by attempting to detect, at step 330, a simulcast sync word. If, at step 330, the simulcast sync word is not detected, the CPU 235 obtains, at step 315, synchronization with a subsequent base station 15 and monitors the signal strength of the transmission to determine, at step 335, whether the signal strength of the subsequent base station 15 is greater than the stored signal strength value. When the signal strength of the subsequent base station 15 is greater, the signal strength value and the fixed information transmitted by the subsequent base station 15 replace, at steps 322, 325, the previously stored fixed information and signal strength value in the RAM 240. This process continues until the simulcast sync word is detected, at which time the microcomputer 225 will have stored the fixed information transmitted by the base station 15 from which the strongest transmission was received. Preferably, the subscriber unit 20 will, at this point, be located within an approximate distance range from the base station 15, as will other subscriber units 20 responding to the same base station 15.

After detection, at step 330, of the simulcast sync word, the CPU 235 receives the simulcast transmission. During this transmission, the CPU 235 receives addresses and determines, at step 336, whether an address associated with the subscriber unit 20 is present. If the address associated with the subscriber unit 20 is detected, at step 336, indicating that a message for the subscriber unit 20 will be transmitted, the LACK seed, tap information, and register order information are retrieved from RAM 240 and provided, at step 340, to the PN sequence generator 265 (FIG. 13). The PN sequence generator 265 thereafter generates and provides a PN sequence to the microcomputer 225 through the I/O bus 230 for reception, at step 345, by the CPU 235. The CPU 235 transfers, at step 350, the PN sequence to the transmitter 215 (FIG. 13) and generates, at step 352, a "transmit" signal to activate the switch 205 and enable the transmission of a spread spectrum LACK signal to the base station 15 during the appropriate 10 ms time slot. Because the LACK is generated using the LACK seed provided by the base station 15, the base station 15 recognizes the LACK as indicating that the subscriber unit 20 is located in the coverage area of the base station 15.

Thereafter, the CPU 235 again obtains, at step 355, synchronization with the base station 15 during the sequential transmission to receive message acknowledgment (MACK) seeds transmitted in a MACK field by the base station 15. When the CPU 235 detects, at step 360, the address corresponding to the subscriber unit 20, the two MACK seeds following the address are stored, at step 365, in the RAM 240. It may be appreciated by one skilled in the art, however, that, in alternate embodiments of the present invention, more or less than two MACK seeds may be provided to the subscriber unit 20. Thereafter, the CPU 235 waits for reception of the message field in which the message is preferably located. The CPU 235, following detection, at step 370, of the subscriber unit address, determines, at step 375, the condition of the message. The condition of the message, e.g., acceptable or unacceptable, may be determined by the performance of an error correction/detection algorithm, as is known to one skilled in the art.

If the message is determined, at step 375, to be acceptable, it is stored and processed as described in FIG. 13. Additionally, the CPU 235 selects, at step 385, a first of the two MACK seeds that is recognized by the base station 15 as indicating that the message is acceptable. If, conversely, the message is unacceptable, the CPU 235 selects, at step 390, a second MACK seed which may indicate, for instance, that the message should be retransmitted by the base station 15. The selected MACK seed, along with the register order information and the tap information, is provided, at step 395, to the PN sequence generator 265 (FIG. 13), which thereafter generates and provides, at step 400, a PN sequence to the CPU 235. In response thereto, the CPU 235 transmits, at step 405, the PN sequence to the transmitter 215, which generates an appropriate spread spectrum MACK signal. The MACK is transmitted by the subscriber unit 20 when the CPU 235 enables, at step 410, transmission from the antenna 200 (FIG. 13) at a 10 ms time slot subsequent to the final closer transmitted by the base station 15 to indicate completion of the message field. It may be appreciated that the 10 ms time slot may vary with variations in the bandwidth and processing gain of the signal, as described above.

Upon reception of the MACK, the base station 15 is able to determine whether or not the message was received in acceptable condition by decoding the PN sequence to determine which of the two provided MACK seeds was utilized for generation of the PN sequence. If, in accordance with the preferred embodiment of the present invention, the base station 15 determines that the message was unacceptable, the address of the subscriber unit 20 is relayed, via dedicated wireline, to the central controller 10 (FIG. 1). Preferably, the central controller 10 stores the message until the subscriber unit 20 has once more transmitted a LACK to a base station 15 included within the messaging system. Thereafter, the message may be provided to another base station 15 for re-transmission to the subscriber unit 20.

Figure 16:
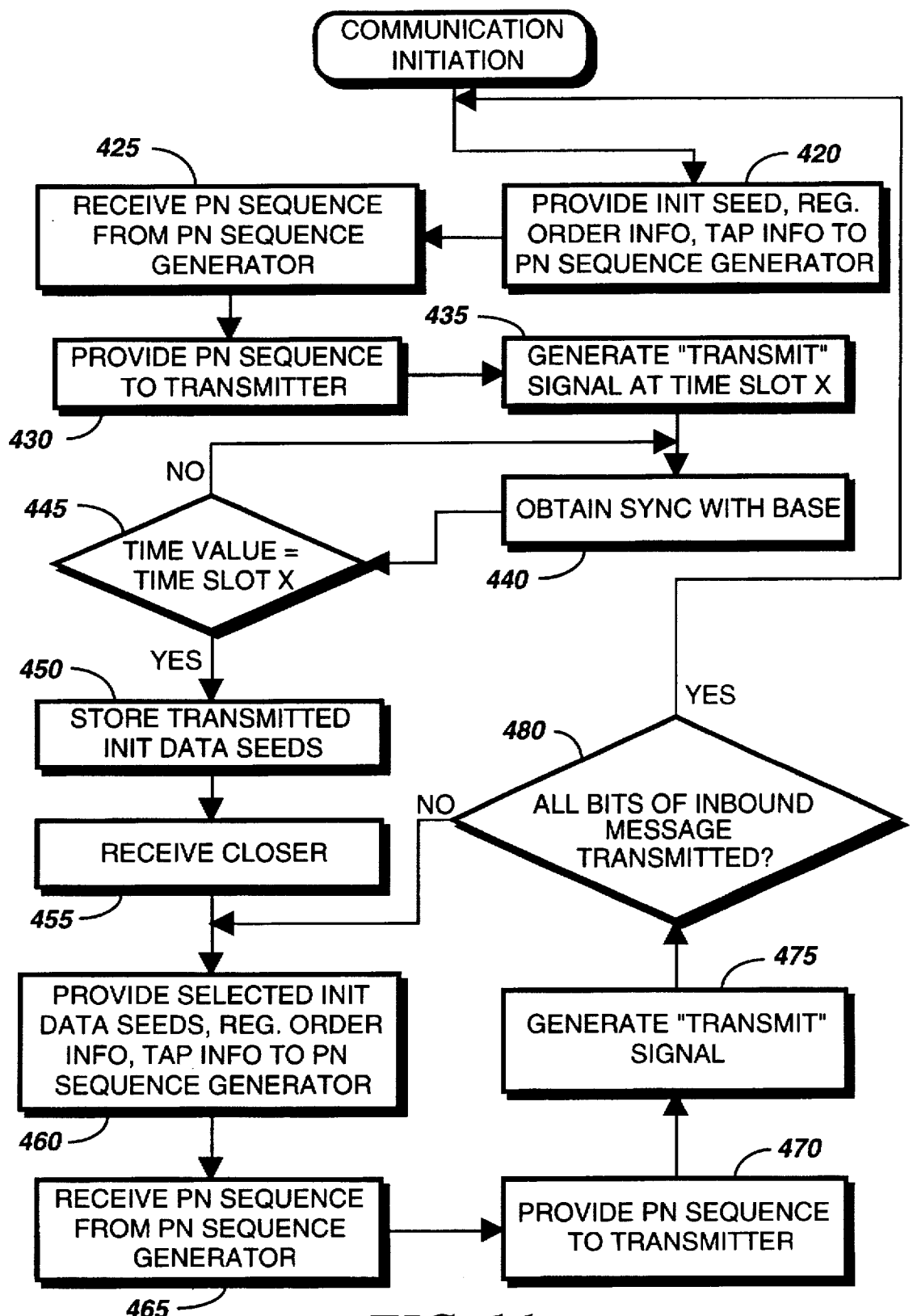
FIG. 16 is a flowchart depicting the further operation of the microcomputer included in the subscriber unit of FIG. 13 in accordance with the preferred embodiment of the present invention.

Referring next to FIG. 16, a flowchart illustrates the communication initiation operation of the microcomputer 225 (FIG. 13) included within the subscriber unit 20. In accordance with the preferred embodiment of the present invention, the subscriber unit 20 is able to initiate communication with and transmit inbound messages to the base stations 15. Communication may be initiated, for example, either in response to user manipulation of the controls 290 (FIG. 13) or automatically, such as at a particular time of the day.

As described in the system description, the subscriber unit 20 receives and stores fixed information, such as the register order information, tap information, and LACK and INIT seeds, provided by the base station 15 having the strongest signal strength during the sequential transmission. Thereafter, when communication with the base station 15 is to be initiated, the CPU 235 retrieves the INIT seed, register order information, and tap information from the RAM 240 for transfer, at step 420 to the PN sequence generator 265 (FIG. 13). In response thereto, the PN sequence generator 265 generates a maximal length PN sequence, which is provided, at step 425, to the CPU 235. The CPU 235 thereafter provides, at step 430, the PN sequence to the transmitter 215 for encoding into a spread spectrum signal, i.e., an INIT signal, that is transmitted when the CPU 235 generates, at step 435, a "transmit" signal directing the switch 205 to couple the transmitter 215 to the antenna 205 during time slot x.

As described above, the base station 15 receives the communication initiation (INIT) signal and stores a time value corresponding to time slot x in memory. Subsequently, prior to transmission of the INIT DATA field included within the variable information, the base station 15 communicates with the central controller 10 to inform the central controller 10 of the number of received INIT signals, in response to which the central controller 10 preferably provides the base station 15 with available seeds, referred to as INIT DATA seeds. These INIT DATA seeds are transmitted by the base station 15 during the INIT DATA field.

After transmission of the INIT signal, the CPU 235 obtains, at step 440, synchronization with the base station 15 during sequential transmission. When, at step 445, a time value corresponding to time slot x is transmitted by the base station 15 and detected by the CPU 235, the INIT DATA seeds following the time value are stored, at step 450, in the RAM 240. It may be appreciated by one skilled in the art, however, that the possibility exists that the CPU 235 will be unable to obtain synchronization with the base station 15 to receive the INIT DATA seeds, such as when the subscriber unit 20 has been relocated out of range of the base station 15. It may therefore be necessary, in some circumstances, for the CPU 235 to resume the operation described in FIGS. 14 and 15 to receive the appropriate INIT seed for initiating communication with a different base station 15.

As described above, the central controller 10 assigns all of the available INIT DATA seeds, or all of a subset of the available INIT DATA seeds, to the base station 15 for equal distribution among any subscriber units 20 from which INIT signals have been received. Therefore, the number of INIT DATA seeds provided by the base station 15 to each subscriber unit 20 could vary. As a result, the base station 15 further transmits a closer after assignment of the INIT DATA seeds to each subscriber unit 20. This closer is received, at step 455, by the CPU 235 and is recognized as indicating that transmission of the INIT DATA seeds to the subscriber unit 20 is complete.

Thereafter, the subscriber unit 20 preferably begins the process of transmitting an inbound message to the base station 15. The inbound message may, for example, include a set of predetermined messages stored in code memory 285 (FIG. 13) and which the user selects by manipulation of the controls 290. Additionally, if the controls 290 include a sufficient range of input keys, such as an alphanumeric keyboard, the user may generate data included in an inbound message by typing characters on the keyboard. Preferably, the predetermined messages or the user-generated data is converted to binary data, in a manner well known to one skilled in the art, which is represented by the INIT DATA seeds.

After storage of the INIT DATA seeds, the CPU 235 retrieves from the RAM 240 and provides, at step 460, to the PN sequence generator 265 register order information, tap information, and a selected INIT DATA seed. The selected INIT DATA seed is preferably representative of binary data included within an inbound message. Thereafter, the PN sequence generator 265 provides, at step 465, a PN sequence to the CPU 235 for transference, at step 470, to the transmitter 215. After the switch 205 has coupled, at step 475, the transmitter 215 to the antenna 205, a spread spectrum signal, i.e., a signal spread across the allocated bandwidth by the PN sequence, is transmitted to the base station 15 from the subscriber unit 20 in a time slot having a duration of the symbol time slot, , e.g., a 10 ms time slot. If the inbound message, including an end-of-message word, is not complete, at step 480, the CPU 235 again selects, at step 460, an appropriate INIT DATA seed and the generation and transmission of PN sequences is repeated until all bits of data included in the inbound message have been transmitted to the base station 15.

As described above, when the spread spectrum signals transmitted by the subscriber unit 20 are centered about a single frequency, the number of bits that may be transmitted during a single symbol time, i.e., 10 ms, is preferably given by the equation $N_{bits}=\log_2 L$, where L is the number of INIT DATA seeds transmitted to the subscriber unit 20. Therefore, as the number of INIT DATA seeds provided to the subscriber unit 20 increases, the time in which an inbound message is transmitted decreases.

By way of example, consider a situation in which an inbound message to be transmitted to the base station 15 comprises the binary data string "1 0 1 1 1 1 0 0 1 0 0 0". If eight INIT DATA seeds are assigned to the subscriber unit 20, the INIT DATA seeds could represent the following 3-bit binary numbers:

| seed 1 | 000 | seed 5 | 100 |
| seed 2 | 001 | seed 6 | 101 |
| seed 3 | 010 | seed 7 | 110 |
| seed 4 | 011 | seed 8 | 111 |

Seed 6 (101), which is representative of the first three bits of data in the inbound message, could be utilized to generate a first PN sequence that could be transmitted in a single symbol time. Similarly, seed 8 (111), seed 2 (001), and seed 1 (000) could be used to next generate sequentially transmitted PN sequences, each of which would take a symbol time to transmit. As a result, the entire inbound message could be transmitted in four symbol times, which, in accordance with the preferred embodiment of the present invention, is approximately equal to 40 ms.

If the subscriber unit 20 is assigned only four INIT DATA seeds, however, the transmission time of the same inbound message requires a significantly longer time. The four INIT DATA seeds could, for instance, represent the following 2-bit binary numbers:
In this case, the same inbound message could be sent by sequentially utilizing seed 3 (10), seed 4 (11), seed 4 (11), seed 1 (00), seed 3 (10), and seed 1 (00) to generate PN sequences for transmission to the base station 15. As can be easily seen, the transmission of the inbound message in this case would require six symbol times, or 60 ms. It may be appreciated, therefore, that it is advantageous to assign as many INIT DATA seeds as possible to each subscriber unit 20 from which an inbound message is to be transmitted.

As mentioned above, the inbound message transmitted by each subscriber unit 20 preferably includes an end-of-message word, which is detected by the base station 15 and recognized as indicating that the transmission of the inbound message is complete. In response to reception of the end-of-message word from a subscriber unit 20, the base station 15 informs the central controller 10 that the INIT DATA seeds assigned to the subscriber unit 20 are no longer in use by the subscriber unit 20. Thereafter, in accordance with the preferred embodiment of the present invention, the central controller 10 may provide the INIT DATA seeds to other base stations 15 as requested. Alternatively, if re-use groups are utilized, the INIT DATA seeds may be conveniently utilized by other re-use cells within the messaging system.

It may be appreciated that, because the subscriber units 20 are able to receive the INIT DATA seeds over the air, they are conveniently able to receive and utilize a varying number of INIT DATA seeds to vary the rate at which data is transmitted to a base station 15. Therefore, the throughput of the inbound messages can be increased or decreased, depending upon system traffic, without including additional or more complex docking circuitry within the subscriber unit 20.

Base Station Description

Figure 17:
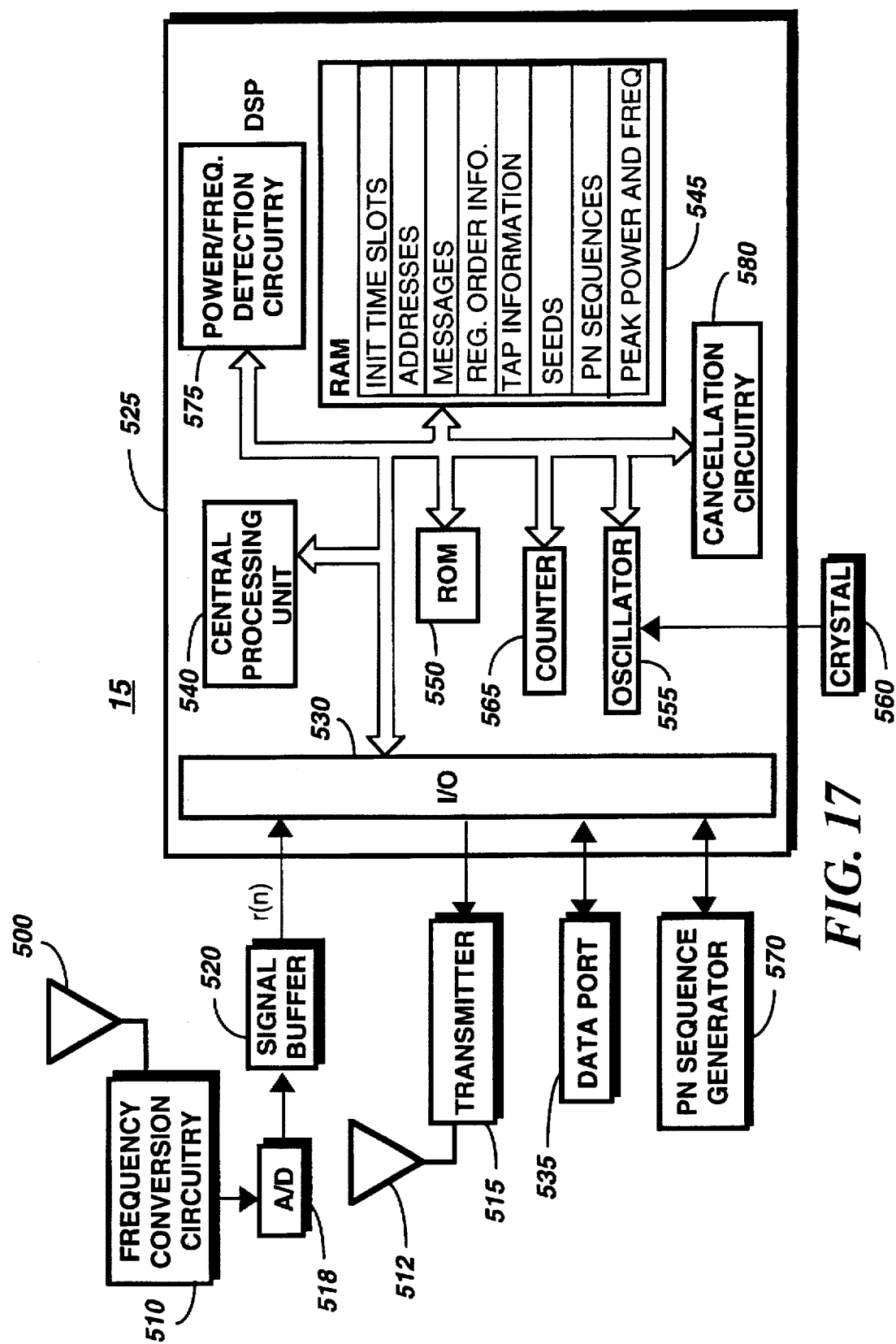
FIG. 17 is an electrical block diagram of a base station included in the messaging system of FIG. 1 in accordance with the preferred embodiment of the present invention.

Referring next to FIG. 17, a base station 15 in accordance with the preferred embodiment of the present invention comprises a receiving antenna 500 for receiving a radio frequency (RF) signal and frequency conversion circuitry 510 coupled to the receiving antenna 500 for downconverting the RF signal to baseband for processing in a manner to be discussed below. A transmitting antenna 512 is further included within the base station 15 for transmitting RF signals, which are generated by a transmitter 515, to subscriber units 20 located within the coverage area of the base station 15.

In accordance with the preferred embodiment of the present invention, the frequency conversion circuitry 510 provides the base band signal to an analog-to-digital converter 518 for sampling the baseband signal, preferably one or more times per chip, to form a digital waveform, which is stored in a signal buffer 520. The digital waveform is thereafter processed, as will be described below, by a controller, such as a digital signal processor (DSP) 525, which is coupled to the signal buffer 520 by an input/output (I/O) bus 530.

Further coupled to the DSP 525 by the I/O bus 530 is a data port 535 by which the base station 15 receives information from and transmits information to the central controller 10 (FIG. 1). Preferably, as described in the system description, the base station 15 receives, prior to transmission of the fixed information (FIG. 2), register order information, taps, and seeds (the LACK and INIT seeds), from the central controller 10 via the data port 535. This fixed information is provided to a central processing unit (CPU) 540 included within the DSP 525. The CPU 540 thereafter stores the fixed information in a random access memory (RAM) 545 coupled to the CPU 540. According to the present invention, the CPU 540 also receives from the data port 535 and stores subscriber unit addresses, messages intended for reception by subscriber units 20 (FIG. 1), and MACK and INIT DATA seeds provided by the central controller 10.

In addition to the RAM 545, the DSP 525 includes a read only memory (ROM) 550, such as an EEPROM, which stores subroutines controlling the operation of the base station 15. Further included in the DSP 525 is an oscillator 555 for generating timing signals utilized in the operation of the DSP 525. A crystal 560 is coupled to the oscillator 555 to provide a reference signal for establishing timing of the DSP 525, and a counter 565, internal to the DSP 525 and coupled to the oscillator 555, provides programmable timing functions which are utilized in controlling the operation of the DSP 525.

In accordance with the preferred embodiment of the present invention, a PN sequence generator 570 is coupled to the DSP 525 by the I/O bus 530. The CPU 540 provides the register order information, taps, and seeds to the PN sequence generator 570 for generation of the possible PN sequences with which subscriber units 20 could transmit the spread spectrum signals to the base station 15. The possible PN sequences could all be stored in the RAM 545, or, alternatively, because the seeds simply determine the starting point of a PN sequence, a single PN sequence could be stored and thereafter shifted by the CPU 540 to generate other possible PN sequences. These PN sequences are utilized by the DSP 525 to decode received spread spectrum signals in a manner to be described below.

It may be appreciated by one skilled in the art that the size of the cells included within the messaging system may be such that the PN sequences experience one or more chip delays. The maximum chip delay, $\Delta$, is approximated by the formula $$\Delta = \frac{r(BW)}{2c},$$

where r is the radius of the cell in meters, BW is the bandwidth of the spread spectrum RF signal, and c is the speed of light ($3 \times 10^8$ meters/second). For example, if the radius of a cell is 24 km, a PN sequence could experience one chip delay from a subscriber unit 20 to the base station 15. Therefore, the possible PN sequences utilized by the DSP 525 to decode a received RF signal might include not only PN sequences generated by the PN sequence generator 570, but also the generated PN sequences shifted in time to account for chip delay. Alternatively, rather than including shifted PN sequences to account for chip delay, the digital waveform itself might be shifted before processing by the DSP 525. If, on the other hand, neither of these alternatives is desirable, the cell size could easily be adjusted to eliminate chip delays altogether, thereby providing for a less complex, and perhaps physically smaller, base station 15 which might have a smaller coverage area.

Figure 18:
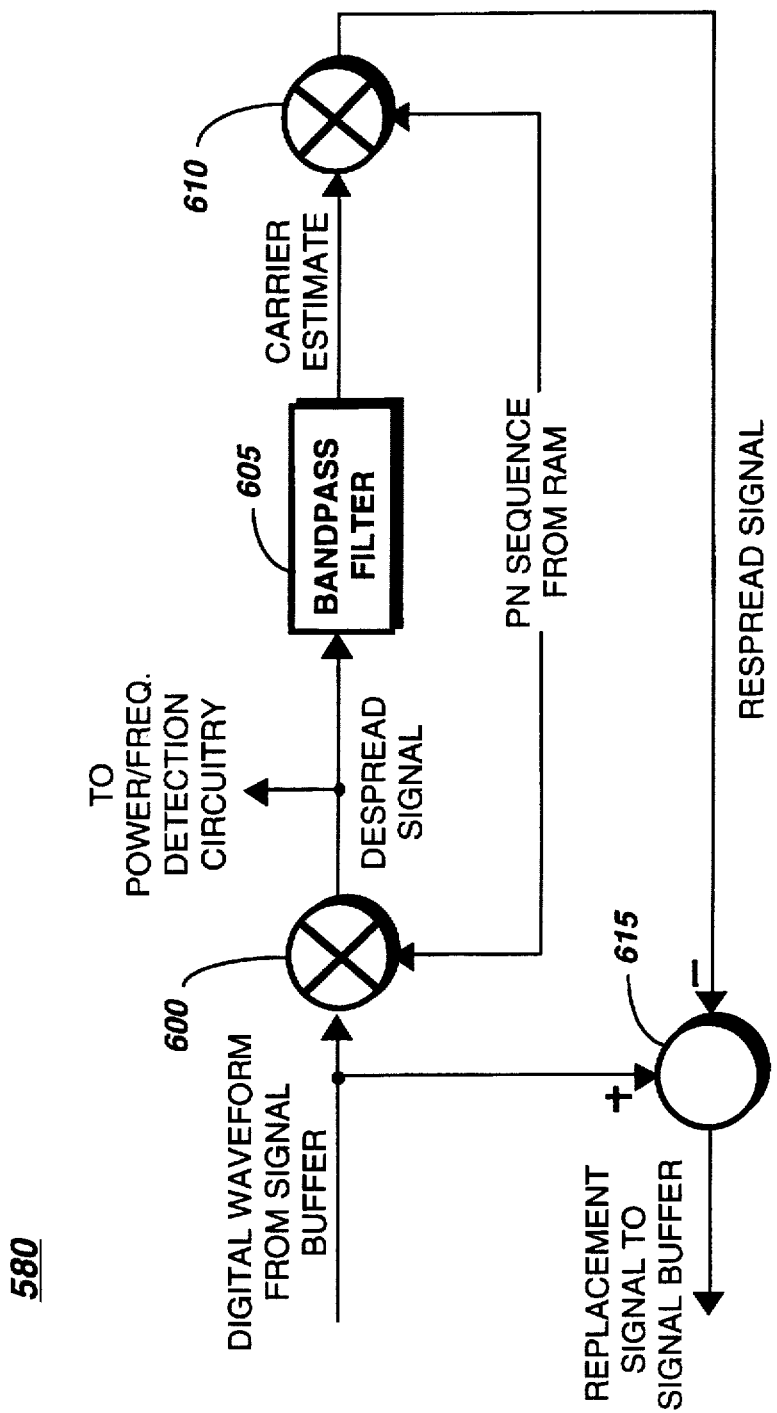
FIG. 18 is an electrical block diagram of cancellation circuitry included in the base station of FIG. 17 in accordance with the preferred embodiment of the present invention.

In accordance with the preferred embodiment of the present invention, the DSP 525 further includes power/frequency detection circuitry 575 and cancellation circuitry 580 for decoding spread spectrum signals, as may be better understood by referring to FIG. 18. FIG. 18 is an electrical block diagram of the cancellation circuitry 580. The cancellation circuitry 580 comprises a first mixer 600 for despreading a signal included within a digital waveform stored in the signal buffer 520 (FIG. 16). Preferably, the despread signal is provided to the power/frequency detection circuitry 575 for determination of the peak spectral power and center frequency of the despread signal. The cancellation circuitry 580 further comprises a bandpass filter 605 coupled to the first mixer 600 for filtering despread signals to form carrier estimates and a second mixer 610 coupled to the bandpass filter 605 for respreading filtered signals. Additionally, an adder 615 is included within the cancellation circuitry 580 for subtracting respread signals from the digital waveform stored in the signal buffer 520. The cancellation process may be better understood by referring to FIGS. 19 and 20.

Figure 19:
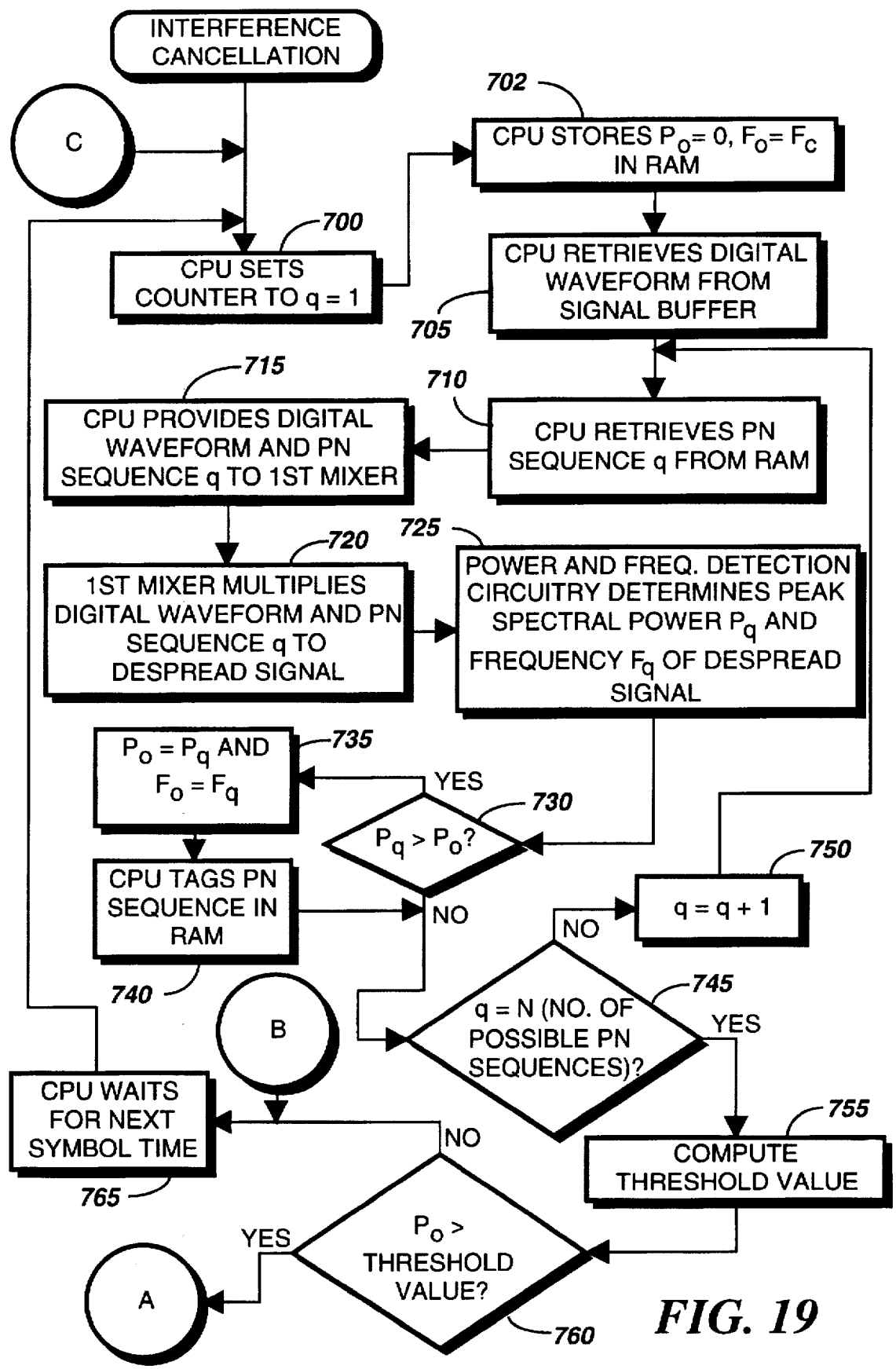
FIGS. 19 and 20 are flowcharts illustrating the interference cancellation process of the microcomputer included in the base station of FIG. 17 in accordance with the preferred embodiment of the present invention.
Figure 20:
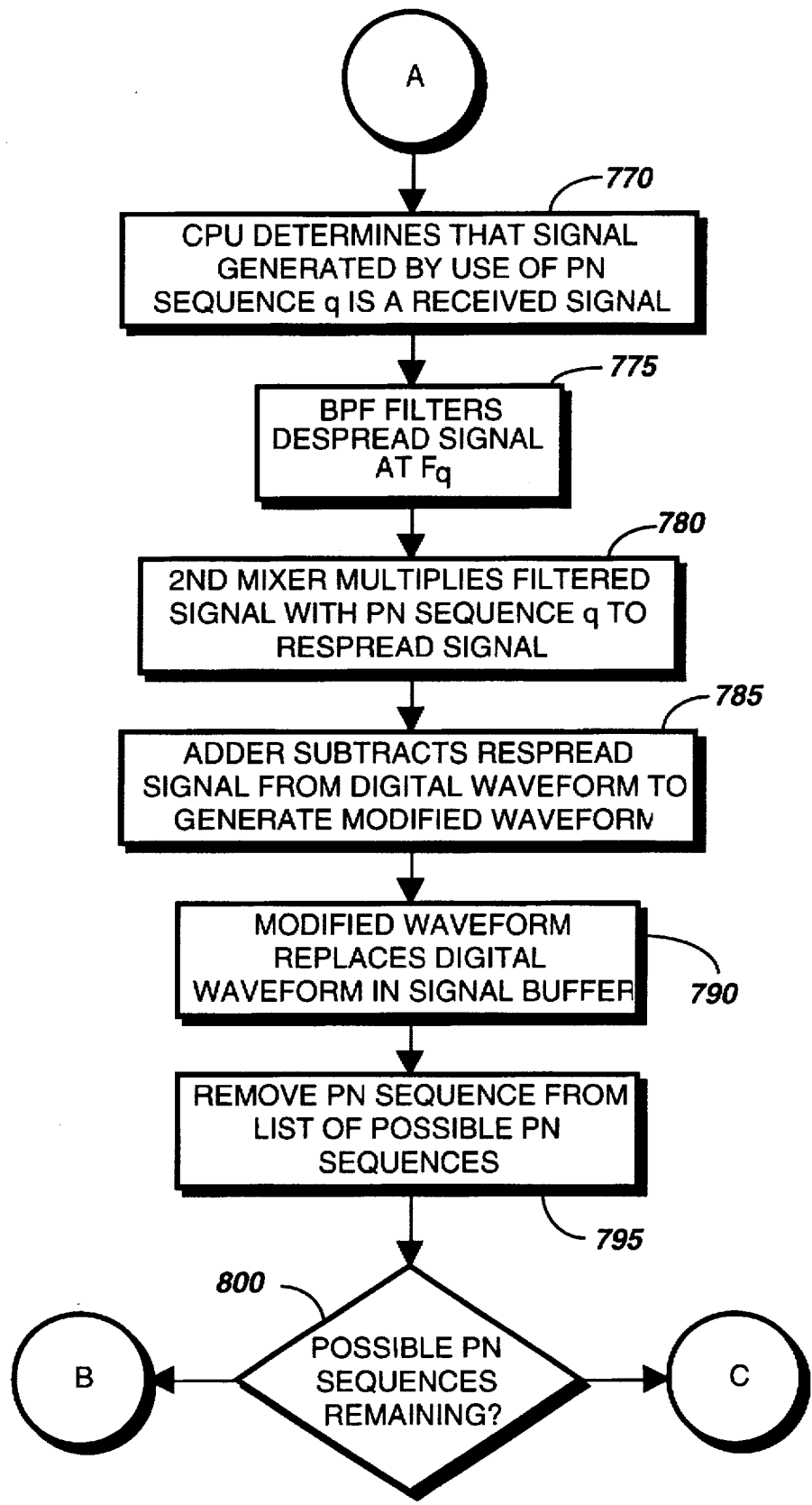

FIGS. 19 and 20 are flowcharts depicting the cancellation process performed by the DSP 525 (FIG. 17) in accordance with the preferred embodiment of the present invention. At the beginning of a symbol time slot, e.g., 10 ms time slot, the CPU 540 sets, at step 700, a counter value, q, equal to one (1), i.e., q=1. Additionally, at step 702, the CPU 540 stores in the RAM 545 an initial power value, which is set to zero, and an initial frequency value, which is set to the center frequency of the bandwidth, i.e., $P_0=0$ and $F_0=F_C$. The CPU then, at steps 705 and 710, retrieves the digital waveform from the signal buffer 520 (FIG. 17) and a qth PN sequence from the RAM 545. The digital waveform and the qth PN sequence are thereafter, at step 715, provided to the first mixer (FIG. 18), which, at step 720, despreads the signal by multiplying the digital waveform by the qth PN sequence. Preferably, the despread signal is provided, at step 725, to the power/frequency detection circuitry 575 for determination, at step 730, of the peak spectral power, $P_q$, and center frequency, $F_q$, of the despread signal. If, at step 730, the peak spectral power is determined to be greater than the initial power value stored in the RAM 545, the CPU 540 sets, at step 735, the power value to the peak spectral power and the initial frequency value to the center frequency of the despread signal, i.e., $P_0=P_q$ and $F_0=F_q$. Additionally, at step 740, the CPU 540 tags the qth PN sequence in the RAM 545 for later identification.

Subsequently, the CPU 540 determines, at step 745, whether the value q is equal to the number N of possible PN sequences with which subscriber units 20 could have transmitted signals. As described above, depending upon the size of the cells included within the messaging system, the possible PN sequences might include shifted PN sequences or a shifted digital waveform to account for different chip delays. As shown, this step (step 745) is also performed when, at step 730, the peak spectral power of the despread signal is less than the initial power value set in the counter 565 (FIG. 17). If, at step 745, q≠N, the value q is incremented, at step 750, in the counter 565. Thereafter, at step 710, a next qth PN sequence is retrieved from the RAM 545 and provided, at step 715, to the first mixer 600. The despreading, power detection, and frequency detection processes described in steps 710 through 750 are repeated by the DSP 525 until the value q is equal to the number of possible PN sequences (q=N), signifying that the peak spectral power and center frequency of all despread signals has been determined. At this point, the PN sequence associated with the despread signal having the greatest spectral power is tagged in the RAM 545 and the power and frequency values of the despread signal having the greatest spectral power are stored in the RAM 545.

When q is determined, at step 745, to equal the number of possible PN sequences, the CPU 540 computes, at step 755, a threshold power value based on the off-peak spectral power of the digital waveform. When, at step 760, the peak spectral power of the despread signal is determined to be less than the threshold power value, the CPU 540 preferably waits, at step 765, for the next symbol time slot and again begins the cancellation process at step 700. Alternatively, for some expected signals, such as for MACKs or INIT DATA signals, the CPU 540 may continue to attempt to decode the signal by referring to the peak powers, although the low power level of the signal may result in inaccurate recovery of data.

When, at step 760, the peak spectral power of the despread signal is determined to be greater than the threshold power value, the CPU 540 determines, at step 770, that the despread signal has been received correctly and is to be processed further. By way of example, if the peak spectral power of the despread signal is greater than the threshold power value, the CPU 540 could determine the type and, if applicable, the meaning of the PN sequence utilized to despread the signal. The PN sequence might, for instance, correspond to a first MACK seed that was utilized by a subscriber unit 20 to indicate that a message was received correctly. In this situation, the base station 15 might notify the central controller 10 that the message has been received by the intended subscriber unit 20 and can be deleted from the central controller message buffer 112 (FIG. 11). Alternatively, the PN sequence could correspond to an INIT seed, in which case the CPU 540 preferably stores the time slot of the INIT signal in the RAM 545 for processing as described in the system and central controller descriptions.

According to the present invention, the despread signal is provided to a bandpass filter 605 (FIG. 18), which filters, at step 775, the despread signal to form a carrier estimate. The carrier estimate is thereafter mixed by the second mixer 610 with the PN sequence utilized to despread the signal, resulting in a respread signal which is subtracted, at step 785, from the digital waveform stored in the signal buffer 520. The resulting modified waveform, i.e., the digital waveform minus the respread signal, replaces the digital waveform in the signal buffer 520. Additionally, the CPU 540 removes, at step 795, the PN sequence from the list of possible PN sequences stored in the RAM 545. The cancellation process as described is continued either until no further possible PN sequences remain, at step 800, or until the peak spectral power of the strongest despread signal is less than the threshold power value, at step 760.

In this manner, the base station 15 is conveniently able to decode all signals received from subscriber units 20 within the coverage area of the base station 15. Furthermore, because the despread signals are removed from the digital waveform in an order determined by their peak spectral power, i.e., strongest signals first, weaker signals, which may have been swamped out by the stronger signals, are more easily detected by the base station 15. Therefore, the base station 15 in accordance with the preferred embodiment of the present invention advantageously alleviates the "near-far" problem present in many conventional CDMA communication systems, in which weaker signals can be indistinguishable from system noise.

In accordance with the preferred embodiment of the present invention, the base station 15 determines a strongest signal, which is subtracted from the digital waveform, subsequent to which the entire process is repeated to determine a next strongest signal for subtraction. This process is continued repeatedly, as described above, until the base station 15 has received all signals present in the digital waveform. Because the strongest signal is removed in each repetition of the cancellation process, this method ensures that each signal is received as accurately as possible. However, alternate embodiments of the present invention are envisioned in which the cancellation process is performed more efficiently, although not necessarily more accurately.

In one such alternate embodiment, the base station 15 might identify, rather than a single strongest signal, a group of strong signals, subsequent to which the entire group is subtracted. Thereafter, the base station 15 could identify another group of strong signals for subtraction. As in the method described above, the process would continue until all signals were decoded by the base station 15. This method would reduce the number of step repetitions necessary in the preferred embodiment. However, while more efficient, the cancellation process in accordance with the alternate embodiment may be more inaccurate than that described in FIGS. 19 and 20, in which stronger signals, and thus interference from the stronger signals, are removed one by one.

In summary, the narrowband CDMA messaging system in accordance with the preferred embodiment of the present invention provides for two-way communication between fixed base stations and portable subscriber units included within the system. Preferably, a central controller coupled to each of the base stations controls the base stations and allocates seeds to the base stations for subsequent transmission to the subscriber units. This seed allocation is performed in two different ways.

In accordance with the "acknowledge-back" capability of the system, the base stations are each assigned unique seeds for transmission to the subscriber units. Thereafter, each subscriber unit utilizes the seeds provided by one of the base stations to generate PN sequences for transmission to the base station as spread spectrum signals. The base station receives and decodes spread spectrum signals transmitted during each time slot to recover the PN sequences included therein. Through use of an interference cancellation technique, the base station is conveniently able to detect each of the PN sequences which were generated using the seeds previously transmitted by the base station.

Unlike conventional base stations, the base station according to the present invention, prior to decoding each signal to recover a PN sequence, determines the signal strength of each signal. The signals are thereafter decoded in an order determined by signal strength. Therefore, because the strongest signals are canceled from the spread spectrum signal first, weaker signals, which might not be detected in conventional systems, are easily detected by the base station. As a result, the near-far problem is alleviated and a greater number of subscriber units are able to simultaneously transmit to the base station. It may be appreciated, furthermore, that it is not necessary for the subscriber units to include complex power control circuitry for implementation of the above described method.

In accordance with the "inbound messaging" aspect of the system, the base stations are allocated seeds depending upon system traffic. If, for example, a base station receives a large number of communication initiation signals from subscriber units, the number of seeds provided to the subscriber units is less than if only a small number of communication initiation signals are received by the base station. Therefore, the number of seeds assigned to a subscriber unit varies with the number of subscriber units requesting communication initiation seeds. As a result, the throughput of the subscriber units is advantageously varied to allow an individual subscriber unit to send data more quickly during time periods when system traffic is light. Alternatively, when system traffic is heavy, a larger number of subscriber units are able to communicate, but the data requires a longer time for transmission. Furthermore, this alteration of system throughput does not require the use of complex docking circuitry within the subscriber units, as would be the case in conventional CDMA systems.

Additionally, the CDMA system in accordance with the preferred embodiment of the present invention conveniently provides for the reuse of sequences within the system. Therefore, when a number of sequences are in use in certain cells within the system, the sequences may be re-used in other designated cells. As a result, because sequences that are in use may be re-allocated to other cells, the number of subscriber units that can transmit during a given time slot is advantageously increased.

It may be appreciated by now that there has been provided a CDMA messaging system in which inbound subscriber throughput may be dynamically altered, depending upon system traffic, to increase or decrease the time in which a given amount of data can be transmitted by the subscriber units. Additionally, the CDMA system does not experience the near-far problem present in conventional CDMA systems and, as a result, provides for an increased number of users within the system. Furthermore, the CDMA system in accordance with the preferred embodiment of the present invention, unlike conventional CDMA systems, utilizes relatively simple subscriber units that do not include complex additional circuitry.

We claim:

1. A method for distributing at least a portion of a plurality of seeds which are used by pseudo-noise (PN) generators to spread and despread spread spectrum signals in a spread spectrum code division multiple access (CDMA) communication system comprising base stations for communicating with portable transceivers, the communication system further comprising a central controller having a memory for storing the plurality of seeds in a database and a processing unit for controlling operation of the base stations and distribution of the at least a portion of the plurality of seeds to the bases stations via a data port, the method comprising the steps of:

at the central controller (a) receiving a seed request from a first base station coupled to the central controller by the data port, (b) determining which of the plurality of seeds stored in the database are available seeds that are used for communication between the first base station and one or more portable transceivers within an associated coverage area thereof without interfering with other base stations within the communication system, and (c) providing a subset of the available seeds to the data port for transfer to the first base station; and at the first base station (d) subsequently transmitting the subset of the available seeds to the one or more portable transceivers for use in generating uniquely identifiable spread spectrum signals for reception by the first base station.

2. The method in accordance with claim 1, wherein the base stations are grouped into a plurality of re-use groups and step (b) comprises the steps of:

at the central controller (b1) determining, by reference to the database, which of the plurality of seeds are tagged in memory to indicate that they have been provided to another requesting base station, wherein the tagged seeds represent assigned seeds and other seeds of the plurality of seeds that have not been tagged represent unassigned seeds that are not currently in use by any of the base stations; and further (b2) determining, by reference to the database, whether any of the assigned seeds have been provided to a second base station, which is included in any of the plurality of re-use groups different than that of the first base station, wherein communications within the coverage area of the first base station will not interfere with communications within the coverage area of the second base station, and wherein the assigned seeds that have been provided to the second base station and the unassigned seeds comprise the available seeds which are to be provided to the first base station for use in communications in the coverage area thereof without interfering with the other base stations in the communication system.

3. The method in accordance with claim 1, further comprising the step of:

at the central controller, and subsequent to step (c), (e) tagging the subset of the available seeds in the database as to indicate that the tagged subset has been provided to the first base station.

4. The method in accordance with claim 3, further comprising the steps of:

at the first base station, when a seed included in the subset of the available seeds provided thereto is no longer in use, (f) transmitting a signal to the data port of the central controller indicating that the seed is no longer in use; and at the central controller, in response to step (f), (g) tagging the seed in the database to indicate that the seed is not currently in use by the first base station.

5. A central controller for distributing a plurality of seeds stored by the central controller to base stations for transmission therefrom to portable transceivers which have pseudo-noise (PN) generators which use the plurality of seeds to generate and transmit spread spectrum signals which are received by the base stations, wherein the central controller, base stations, and portable transceivers are included in a code division multiple access (CDMA) communication system, the central controller comprising:

a database for storing the plurality of seeds;

a data port for receiving a seed request from a first of the base stations; and a processing unit, coupled to the database and the data port, for determining by reference to the database, which, if any, of the plurality of seeds are suitable for utilization by one or more portable transceivers located within the coverage area of the first base station without interfering with other base stations in the communication system, and for retrieving from the database one or more of the plurality of seeds that are to be utilized by the one or more portable transceivers located within the coverage area of the first base station without interfering with the other base stations, wherein the retrieved seeds are provided to the data port for subsequent transmission therefrom to the first base station.

6. The central controller in accordance with claim 5, further comprising tagging means for tagging, in the database, each of the ones of the plurality of seeds provided to the first base station to indicate that the tagged ones of the plurality of seeds are currently in use by the first base station.

7. The central controller in accordance with claim 6, further comprising a telephone interface which is coupled to the processing unit for receiving messages and a message buffer coupled to the telephone interface for temporarily storing the messages which are received.

8. The central controller in accordance with claim 7, wherein the processing unit automatically provides a unique seed included in the plurality of seeds to the data port for subsequent transmission therefrom to each of the base stations in the communication system, wherein each of the base stations transmits its unique seed for utilization by a portable transceiver in the coverage area thereof to generate a spread spectrum signal indicating to a closest base station that the portable transceiver is in the coverage area thereof.

9. A spread spectrum, code division multiple access (CDMA) communication system for providing two-way communication, the communication system comprising:

base stations for receiving spread spectrum signals over the air and for generating seed requests depending upon the number of received spread spectrum signals; and a central controller, coupled to and controlling the base stations and having a memory in which a plurality of seeds are stored, the plurality of seeds are used by pseudo-noise (PN) generators within the base stations for generating PN sequences for despreading signals which have been spread using the plurality of seeds by pseudo-random noise (PN) generators within portable transceivers the central controller selectively distributing a portion of the plurality of seeds to each of the base stations in accordance with the seed requests.

10. The communication system in accordance with claim 9, wherein:

the central controller comprises determining means for determining, for each base station from which a seed request was received, which one of the plurality of seeds are suitable for utilization in spread spectrum communication within the coverage area of that base station without interfering with other base stations in the communication system.

11. The communication system in accordance with claim 10, further comprising at least one portable transceiver for communicating with a closest base station, the at least one portable transceiver utilizing at least one of the portion of the plurality of seeds provided to the closest base station to generate spread spectrum signals uniquely associated with the closest base station.

12. The communication system in accordance with claim 11, wherein:

the base stations are grouped into re-use groups including first and second base stations, located in different re-use groups, that utilize same portion of the plurality of seeds for spread spectrum communication without interfering with each other or with other base stations in the communication system.

13. A communication system for providing two-way spread spectrum, code division multiple access (CDMA) communication, the communication system comprising:

a portable transceiver for using a pseudo-noise (PN) generator to generate spread spectrum signals using at least one seed;

base stations for transmitting and receiving spread spectrum signals, wherein a first of the base stations provides the portable transceiver with the at least one seed and receives the spread spectrum signals generated by the portable transceiver; and a central controller coupled to and controlling the base stations, the central controller comprising:

memory means for storing a plurality of seeds, including the at least one seed provided to the portable transceiver by the first base station, for use in spread spectrum communication;

determining means for determining which one of the base stations, other than the first base station, is a second base station, wherein communications between the first base station and the portable transceiver will not interfere with communications within the coverage area of the second base station when the second base station also utilizes the at least one seed provided to the first base station; and processing means coupled to the memory means for also providing the at least one seed to the second base station for use thereby in spread spectrum communication.

\* \* \* \* \*

UNITED STATES PATENT AND TRADEMARK OFFICE
CERTIFICATE OF CORRECTION

PATENT NO. : 5,761,196
DATED : June 2, 1998
INVENTOR(S) : Ayerst et al.

It is certified that error appears in the above-indentified patent and that said Letters Patent is hereby corrected as shown below:

Claim 1, Column 25, line 18, change "bases" to --base--.

Claim 6, Column 26, line 40, change "ones" to --each one or more--.

Claim 9, Column 27, line 3, after transceivers, insert --,--.

Signed and Sealed this

Twentieth Day of April, 1999

*Attest:*

*Attesting Officer*

Q. TODD DICKINSON

*Acting Commissioner of Patents and Trademarks*